(12) United States Patent
Faruquie et al.

(10) Patent No.: US 11,360,971 B2
(45) Date of Patent: Jun. 14, 2022

(54) COMPUTER-BASED SYSTEMS CONFIGURED FOR ENTITY RESOLUTION FOR EFFICIENT DATASET REDUCTION

(71) Applicant: Capital One Services, LLC, McLean, VA (US)

(72) Inventors: Tanveer Afzal Faruquie, McLean, VA (US); Christopher J. Johnson, McLean, VA (US); Peter Deng, McLean, VA (US); Aman Jain, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/744,919

(22) Filed: Jan. 16, 2020

(65) Prior Publication Data
US 2021/0224258 A1    Jul. 22, 2021

(51) Int. Cl.
| | | |
|---|---|---|
| *G06F 16/242* | (2019.01) | |
| *G06N 20/00* | (2019.01) | |
| *G06F 16/23* | (2019.01) | |
| *G06F 16/28* | (2019.01) | |
| *G06F 16/215* | (2019.01) | |

(52) U.S. Cl.
CPC .......... *G06F 16/244* (2019.01); *G06F 16/215* (2019.01); *G06F 16/2358* (2019.01); *G06F 16/2379* (2019.01); *G06F 16/285* (2019.01); *G06F 16/288* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,467,526 | B1* | 11/2019 | Appalaraju | G06V 10/82 |
| 2014/0279757 | A1* | 9/2014 | Shimanovsky | H04W 4/021 |
| | | | | 706/12 |
| 2017/0091692 | A1* | 3/2017 | Guo | G06N 5/003 |
| 2019/0034475 | A1* | 1/2019 | Parikh | G06F 16/215 |
| 2019/0179951 | A1* | 6/2019 | Brunet | G06F 16/2365 |
| 2020/0210466 | A1* | 7/2020 | Yin | G06N 20/20 |
| 2020/0210771 | A1* | 7/2020 | Zeng | G06K 9/6257 |

OTHER PUBLICATIONS

Wang et al., "CrowdER: Crowdsourcing Entity Resolution," 2012 (Year: 2012).*

* cited by examiner

*Primary Examiner* — Yu Zhao
(74) *Attorney, Agent, or Firm* — Greenberg Traurig, LLP

(57) ABSTRACT

In order to facilitate entity resolution, systems and methods include a processor receiving first records associated with one or more entities, and second records associated with the one or more entities. The processor generates candidate pairs based on a similarity between first entity data and second entity data. The processor generates features for each candidate pair based on similarity measures between the first entity record and the second entity record. The processor utilizes a scoring machine learning model to determine a match score for each candidate pair based on each feature. The processor determines clusters of candidate pairs based on the match score of each feature for each candidate pair. The processor merges records of candidate pairs of each cluster into a respective entity record. The processor determines an entity associated with each entity record and updates an entity database with the entity record.

20 Claims, 22 Drawing Sheets

COMPUTER-BASED SYSTEMS CONFIGURED FOR ENTITY RESOLUTION FOR EFFICIENT DATASET REDUCTION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based systems configured for one or more novel technological applications of entity resolution for efficient dataset reduction.

BACKGROUND OF TECHNOLOGY

A computer system may include a group of computers (e.g., clients, servers, smart routers) and other computing hardware devices that are linked together through one or more communication channels to facilitate communication and resource-sharing, via one or more specifically programmed graphical user interfaces (GUIs), among a wide range of users.

In some cases, one or more of the computing hardware devices collects information pertaining to an entity where the information may be recorded in the duplicative. Evaluating entity records would often require a large resource cost with difficult to understand results.

SUMMARY OF DESCRIBED SUBJECT MATTER

In some embodiments, the present disclosure provides an illustrative computer-based method that includes at least the following steps of receiving, by at least one processor, a first entity record set including a plurality of first records associated with one or more entities, where each first entity record of the plurality of first entity records include respective first entity data representing identifying information associated with a respective first entity. Receiving, by the at least one processor, a second entity record set including a plurality of second records associated with the one or more entities, where each second entity record of the plurality of second entity records include respective second entity data representing identifying information associated with a respective second entity. Generating, by the at least one processor, candidate pairs based at least in part on a similarity between the first entity data of each first entity record and the second entity data of each second entity record, where each candidate pair includes a first entity record of the plurality of first entity records and a second entity record of the plurality of second entity records. Generating, by the at least one processor, one or more features for each respective candidate pair based at least in a part on a respective at least one similarity measure between a respective first entity record and a respective second entity record. Utilizing, by the at least one processor, a scoring machine learning model to determine a match score for each candidate pair based at least in part on each feature of the one or more features for each candidate pair. Determining, by the at least one processor, at least one cluster of candidate pairs based on the match score of each feature of the one or more features for each candidate pair. Merging, by the at least one processor, records of candidate pairs of each respective cluster of the at least one cluster into a respective entity record of at least one entity record. Determining, by the at least one processor, a respective entity associated with each respective entity record. Updating, by the at least one processor, an entity database with the at least one entity record.

In some embodiments, the present disclosure provides an illustrative computer-based method that includes at least the following steps of receiving, by at least one processor, a first entity record set including a plurality of first records associated with one or more entities, where each first entity record of the plurality of first entity records include respective first entity data representing identifying information associated with a respective first entity. Receiving, by the at least one processor, a second entity record set including a plurality of second records associated with the one or more entities, where each second entity record of the plurality of second entity records include respective second entity data representing identifying information associated with a respective second entity. Generating, by the at least one processor, candidate pairs based at least in part on a similarity between the first entity data of each first entity record and the second entity data of each second entity record using a combination of a minhash and rule-based probabilities of similarity, where each candidate pair includes a first entity record of the plurality of first entity records and a second entity record of the plurality of second entity records. Generating, by the at least one processor, one or more features for each respective candidate pair based at least in a part on a respective at least one similarity measure between a respective first entity record and a respective second entity record. Utilizing, by the at least one processor, a scoring machine learning model to determine a match score for each candidate pair based at least in part on Xgboost modelling of each feature of the one or more features for each candidate pair. Determining, by the at least one processor, at least one cluster of candidate pairs based on the match score of each feature of the one or more features for each candidate pair. Merging, by the at least one processor, records of candidate pairs of each respective cluster of the at least one cluster into a respective entity record of at least one entity record. Determining, by the at least one processor, a respective entity associated with each respective entity record. Updating, by the at least one processor, an entity database with the at least one entity record.

In some embodiments, the present disclosure provides an illustrative technically improved computer-based system that includes at least the following components of an entity database configured to store entity records, and at least one processor configured to perform instructions stored in a non-transitory storage medium. The instructions include: receive a first entity record set including a plurality of first records associated with one or more entities, where each first entity record of the plurality of first entity records include respective first entity data representing identifying information associated with a respective first entity; receive a second entity record set including a plurality of second records associated with the one or more entities, where each second entity record of the plurality of second entity records include respective second entity data representing identifying information associated with a respective second entity; generate candidate pairs based at least in part on a similarity between the first entity data of each first entity record and the second entity data of each second entity record, where each candidate pair includes a first entity record of the plurality of first entity records and a second entity record of the plurality of second entity records; generate one or more features for each respective candidate pair based at least in a part on a respective at least one similarity measure between a respective first entity record and a respective second entity record; utilize a scoring machine learning model to determine a match score for each candidate pair based at least in part on each feature of the one or more features for each candidate pair; determine at least one cluster of candidate pairs based on the match score of each feature of the one or more features for each candidate pair; merge records of candidate pairs of each respective cluster of the at least one cluster into a respective entity record of at least one entity record; determine a respective entity associated with each respective entity record; and update the entity database with the at least one entity record.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
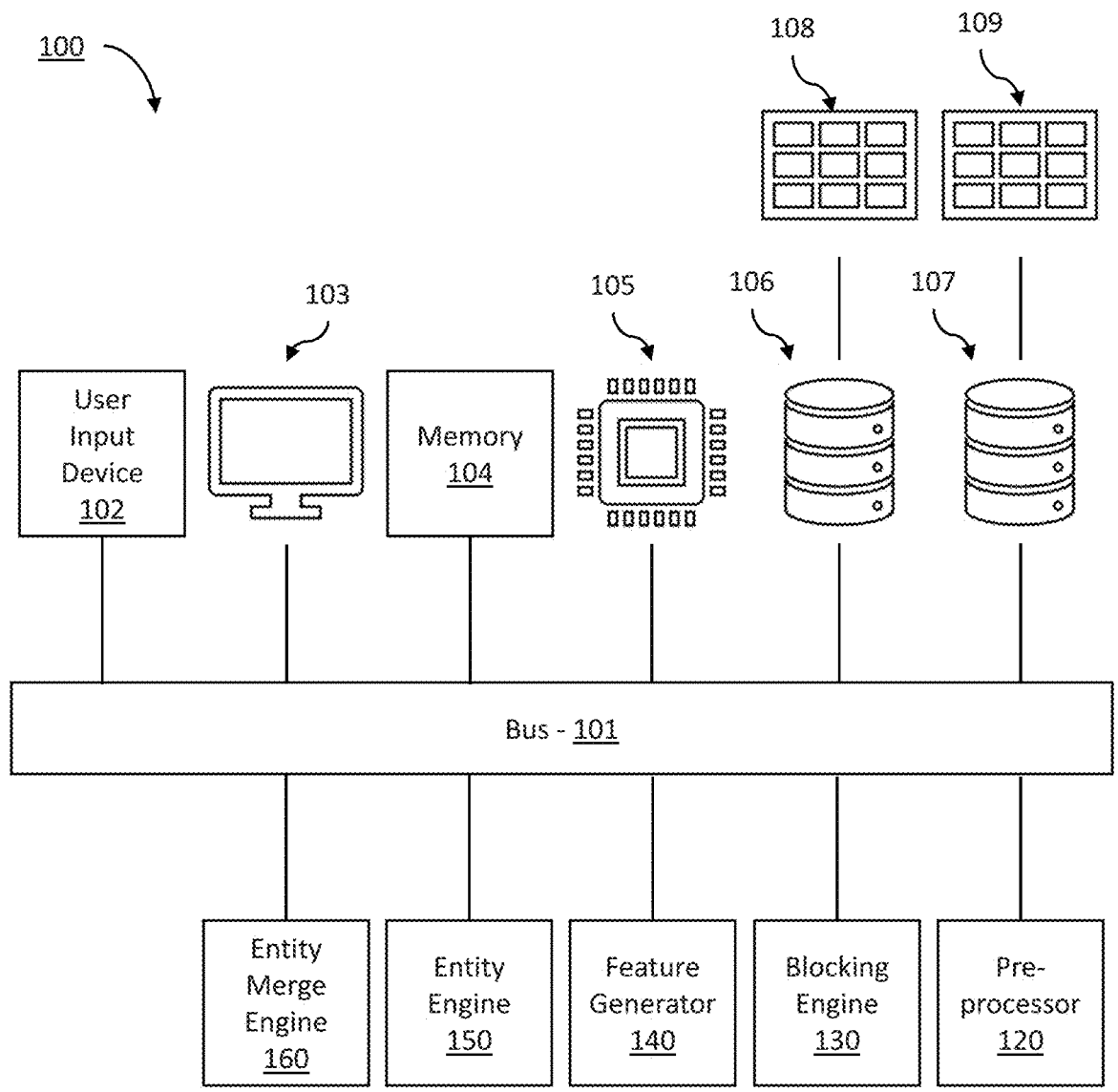
FIGS. 1-12K show one or more schematic flow diagrams, certain computer-based architectures, and screenshots of various specialized graphical user interfaces which are illustrative of some illustrative aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect or functionality of various embodiments described herein can be performed in real-time and dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and linguistic relatives or derivatives, mean that certain events or actions can be triggered or occur without any human intervention. In some embodiments, events or actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, illustrative, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed, programmed or configured to manage or control other software and hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and computing software languages (e.g., C++, Objective-C, Swift, Java, JavaScript, Python, Perl, QT, etc.).

In some embodiments, one or more of illustrative computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of illustrative computer-based systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc. In some embodiments, as detailed herein, one or more of illustrative computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, illustrative software specifically programmed in accordance with one or more principles of the present disclosure may be downloadable from a network, for example, a website, as a stand-alone product or as an add-in package for installation in an existing software application. For example, illustrative software specifically programmed in accordance with one or more principles of the present disclosure may also be available as a client-server software application, or as a web-enabled software application. For example, illustrative software specifically programmed in accordance with one or more principles of the present disclosure may also be embodied as a software package installed on a hardware device.

In some embodiments, illustrative computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999, 999), at least 1,000,000,000 (e.g., but not limited to, 1,000,000,000-999,999,999,999), and so on.

In some embodiments, illustrative computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems of the present disclosure may be configured to be utilized in various applications which may include, but not limited to, gaming, mobile-device games, video chats, video conferences, live video streaming, video streaming and augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device or system of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems of the present disclosure may be configured to securely store or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of database communication, data collection and processing, data visualization, index generation. The following embodiments provide technical solutions and technical improvements that overcome technical problems, drawbacks or deficiencies in the technical fields involving database inefficiencies, database interoperability, data accuracy and data portability, among others. As explained in more detail, below, technical solutions and technical improvements herein include aspects of improved machine learning, entity resolution, database interoperability, service interoperability, among others. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of another illustrative computer-based system for entity resolution in accordance with one or more embodiments of the present disclosure.

In some embodiments, an illustrative entity evaluation system 100 includes a computing system having multiple components interconnect through, e.g., a communication bus 101. In some embodiments, the communication bus 101 may be a physical interface for interconnecting the various components, however in some embodiments, the communication bus 101 may be a network interface, router, switch, or other communication interface. The entity evaluation system 100 may receive a first set of records 108 and second set of records 109, and the various components may interoperate to match data items from each set of records and generate an evaluation and characterization of each entity included in the first or second set of records 108 or 109, or both. In some embodiments, the evaluation and characterization may include determining a value for each record associated with an entity and aggregating the total value for each entity to generate an activity index to characterize each entity.

In some embodiments, the entity evaluation system 100 may include a processor 105, such as, e.g., a complex instruction set (CISC) processor such as an x86 compatible processor, or a reduced instruction set (RISC) processor such as an ARM, RISC-V or other instruction set compatible processor, or any other suitable processor including graphical processors, field programmable gate arrays (FPGA), neural processors, etc.

In some embodiments, the processor 105 may be configured to perform instructions provided via the bus 101 by, e.g., accessing data stored in a memory 104 via the communication bus 101. In some embodiments, the memory 104 may include a non-volatile storage device, such as, e.g., a magnetic disk hard drive, a solid-state drive, flash memory, or other non-volatile memory and combinations thereof, a volatile memory such as, e.g., random access memory (RAM) including dynamic RAM or static RAM, among other volatile memory devices and combinations thereof. In some embodiments, the memory 104 may store data resulting from processing operations, a cache or buffer of data to be used for processing operations, operation logs, error logs, security reports, among other data related to the operation of the entity evaluation system 100.

In some embodiments, a user or administrator may interact with the entity evaluation system 100 via a display 103 and a user input device 102. In some embodiments, the user input device 102 may include, e.g., a mouse, a keyboard, a touch panel of the display 103, motion tracking or detecting, a microphone, an imaging device such as a digital camera, among other input devices. Results and statuses related to the entity evaluation system 110 and operation thereof may be displayed to the user via the display 103.

In some embodiments, a first source database 106 may communicate with the entity evaluation system 100 via, e.g., the communication bus 101 to provide the first source records 108. In some embodiments, the first source records 108 may include records having data items associated with first entities may include entities, such as, e.g., commercial entities, including merchants, industrial entities, firms and businesses, as well as individuals, governmental organizations, or other entities that are the same or different from the first entities. In some embodiments, the first source records 108 include records of data items identifying, e.g., each merchant in a geographic area, each merchant in a catalogue or database of business partners or business customers, or other database of merchants and associated records. In some embodiments, the data items may include, e.g., information related to an entity name or secondary name, address, a business owner, a geographic location (e.g., latitude and longitude), a zip code, telephone number, industry category or description (e.g., education, healthcare, food services, etc.), franchise indicator (e.g., a "1" to designate a franchise, or a "0" to designate not a franchise, or vice versa), among other information and combinations thereof. In some embodiments, the first source records 108 are collected from, e.g., a consumer transaction database, web search results, an entity index, or other compilation of entity records into a database such as, e.g., the first source database 106.

In some embodiments, a second source database 107 may communicate with the entity evaluation system 100 to provide second source records 109 via, e.g., the communication bus 101. In some embodiments, the second source records 109 may include entity records identifying entities, such as, e.g., commercial entities, including merchants, industrial entities, firms and businesses, as well as individuals, governmental organizations, or other entities that are the same or different from the first entities. In some embodiments, the second source records 109 include records of data items identifying, e.g., each merchant in a geographic area, each merchant in a catalogue or database of business partners or business customers, or other database of merchants and associated records. In some embodiments, the data items may include, e.g., information related to an entity name or secondary name, address, a business owner, a geographic location (e.g., latitude and longitude), a zip code, telephone number, industry category or description (e.g., education, healthcare, food services, etc.), franchise indicator (e.g., a "1" to designate a franchise, or a "0" to designate not a franchise, or vice versa), among other information and combinations thereof. In some embodiments, the second source records 109 are collected from, e.g., a consumer transaction database, web search results, an entity index, or other compilation of entity records into a database such as, e.g., the second source database 107.

In some embodiments, the first source database 106 and the second source database 107 may provide respective records for entities transacting with a selected product type, a particular service, having a particular size, or any other subset. In some embodiments, the first source database 106 may provide first source records 108 for all known first entities, or for all known second entities satisfying a user configured categorization, and the second source database 107 may provide second source records 109 for all known second entities, or for all known second entities satisfying a user configured categorization.

In some embodiments, the entity evaluation system 100 may use the first source records 108 and the second source records 109 to evaluate each entity identified in each of the first source records 108 and the second source records 109 to merge the all records into a merged records database. In some embodiments, the merged records database may be one of the first source database 106 or the second source database 107. Thus, records from one of the databases may be merged into the merged database of the first source database 106 or second source database 107. Accordingly, in some embodiments, a set of components communicate with the communication bus 101 to provide resources for, e.g., matching first source records 108 with second source records 109, establishing records associated with common entities.

In some embodiments, a pre-processor 120 receives the first source records 108 and the second source records 109. In some embodiments, the pre-processor 120 may include, e.g., a memory having instructions stored thereon, as well as, e.g., a buffer to load data and instructions for processing, a communication interface, a controller, among other hardware. A combination of software or hardware may then be implemented by the pre-processor 120 in conjunction with the processor 105 or a processor dedicated to the pre-processor 120 to implement the instructions stored in the memory of the pre-processor 120.

In some embodiments, the first source records 108 and the second source records 109 include raw data from the collection of entity records. As such, the data items from the first source records 108 and the second source records 109 may include, e.g., a variety of data formats, a variety of data types, unstructured data, duplicate data, among other data variances. Thus, to facilitate processing and using the data for consistent and accurate results, the data may be pre-processed to remove inconsistencies, anomalies and variances. Thus, in some embodiments, the pre-processor 120 may ingest, aggregate, and cleanse, among other pre-processing steps and combinations thereof, the data items from each of the first source records 108 and the second source records 109.

Using the pre-processor 120, the first source records 108 may be compiled into a single structure, such as, e.g., a single file, a single table, a single list, or other data container having consistent data item types. For example, each first source record may be added to, e.g., a table with data items identified for each of, e.g., an entity name, an entity executive or owner, an entity address, an entity zip code, an entity geographic location (e.g., in latitude and longitude), an entity phone number, telephone number, industry category or description (e.g., education, healthcare, food services, etc.), franchise indicator (e.g., a "1" to designate a franchise, or a "0" to designate not a franchise, or vice versa), among other fields. The format of each field may be consistent across all records after pre-processing by the pre-processor 120 such that each record has a predictable representation of the data recorded therein.

Similarly, using the pre-processor 120, the second source records 109 may be compiled into a single structure, such as, e.g., a single file, a single table, a single list, or other data container having consistent data item types. For example, each second source record may be added to, e.g., a table with data items identified for each of, e.g., an entity name, an entity executive or owner, an entity address, an entity zip code, an entity geographic location (e.g., in latitude and longitude), an entity phone number, telephone number, industry category or description (e.g., education, healthcare, food services, etc.), franchise indicator (e.g., a "1" to designate a franchise, or a "0" to designate not a franchise, or vice versa), among other fields. The format of each field may be consistent across all records after pre-processing by the pre-processor 120 such that each record has a predictable representation of the data recorded therein.

In some embodiments, the structures containing each of the pre-processed first source records and the pre-processed second source records may be stored in, e.g., a database or a storage, such as, e.g., the memory 104, or a local storage of the pre-processor 120.

In some embodiments, a blocking engine 130 receives the pre-processed first source records 108 and the pre-processed second source records 109. In some embodiments, the blocking engine 130 may include, e.g., a memory having instructions stored thereon, as well as, e.g., a buffer to load data and instructions for processing, a communication interface, a controller, among other hardware. A combination of software and hardware may then be implemented by the blocking engine 130 in conjunction with the processor 105 or a processor dedicated to the blocking engine 130 to implement the instructions stored in the memory of the blocking engine 130.

In some embodiments, the first source records 108 and the second source records 109 each include entities from independent sources. Matching the entities from the independent sources to merge duplicates may be a processor intensive and resource intensive process. However, in some embodiments, to reduce the use of resources, the blocking engine 130 may perform an initial rough estimate of candidate entity matches between the first source records 108 and the second source records 109.

In some embodiments, to perform the initial estimate, the blocking engine 130 may utilize, e.g., a heuristic search, an algorithm based on rule-based matching, a Minhash algorithm, or other suitable blocking technique and combinations thereof. The blocking may then match records in the pre-processed first source records 108 with records of the pre-processed second source records 109. In some embodiments, the heuristic search may compare each first source record to each second source record to compare, e.g., a second entity data item of the first record to a second entity record identifier data item representing a second entity record identifier of each second source record and determines potential matches based on the distance of pairs of values representing the data items. Similarly, a rule-based algorithm may iteratively compare each potential pair of a record from the first source records 108 with a record from the second source records 109. However, to reduce processing operations and permutations of record pairs, Minhash may be employed to determine likely matches without a need to assess each potential pair individually. However, to reduce the possibility of missing a possible pair using Minhash, Minhash may be combined with one or both of the heuristic search and rule-based algorithm.

Other or additional data items of each of the first and second source records 108 and 109 may be incorporated in the blocking to determine potential matches. As a result, candidate pairs of potentially matching records between the first source records 108 and the second source records 109 may be linked using, e.g., a table of each first record with a potentially matching second source record. Other formats of presenting the potential matches are also contemplates, such as, e.g., a table having a column with the row including the second source record with a row of the potentially matching first source record, a separate file for each first source record including data from each potentially matching second source record, a separate file for each second source record including data from each potentially matching first source record, a table having a column with a row for each second source record with a sub-row of the row including each potentially matching first source record, a table having a column with a row for each first source record with a sub-row of the row including each potentially matching second source record, among other possible formats of presenting the blocked first source records 108 and blocked second source records 109. Herein, the term "block" or "blocked" or "blocking" refers to a block of records or data items associated with a given record to associate multiple potential matches of data of a first type with a particular data of a second type.

In some embodiments, the table or other representation of matching records may be stored in, e.g., a database or a storage, such as, e.g., the memory 104, or a local storage of the blocking engine 130.

In some embodiments, a feature generator 140 receives blocked candidate pairs of the first source records 108 and the second source records 109. In some embodiments, the feature generator 140 may include, e.g., a memory having instructions stored thereon, as well as, e.g., a buffer to load data and instructions for processing, a communication interface, a controller, among other hardware. A combination of software and hardware may then be implemented by the feature generator 140 in conjunction with the processor 105 or a processor dedicated to the feature generator 140 to implement the instructions stored in the memory of the feature generator 140.

In some embodiments, to facilitate matching records, the feature generator 140 generate or extract features representative of characteristics of each record. The features may, therefore, characterize quantitatively the data entity representing an entity identified within the respective records (e.g., a user, merchant, organization, or other entity). In some embodiments, the features quantify the characteristics such that similarities between records may be quantified based on the similarity of the features. In some embodiments, the features include semantic features, such as, e.g., names, industry descriptions or categorizations, among other semantic features. In some embodiments, the features may include quantitative features, such as, e.g., location measurements, phone numbers, addresses, among others.

In some embodiments, a table or other representation of features of potentially matching records may be generated to correlate first data entity features with the associated first source records and second data entity features with the associated second source records to quantify each entity represented therein. In some embodiments, the table may then be stored in, e.g., a database or a storage, such as, e.g., the memory 104, or a local storage of the feature generator 140.

In some embodiments, an entity engine 150 receives the first data entity feature vectors and the second data entity feature vectors. In some embodiments, the entity engine 150 may include, e.g., a memory having instructions stored thereon, as well as, e.g., a buffer to load data and instructions for processing, a communication interface, a controller, among other hardware. A combination of software and hardware may then be implemented by the entity engine 150 in conjunction with the processor 105 or a processor dedicated to the entity engine 150 to implement the instructions stored in the memory of the entity engine 150.

In some embodiments, the entity engine 150 may utilize the first data entity feature vectors and the second data entity feature vectors to resolve entity matches. For example, using the blocked first source records and blocked second source records described above, the entity engine 150 may compare the first data entity feature vectors of the first source records in a block to the second data entity feature vectors of the second source records in the same block. Thus, the entity engine 150 may determine a score indicative of a probability of matches from the set of candidate matches.

In some embodiments, the entity engine 150 utilizes a machine learning model to compare the first data entity feature vectors with each candidate matching second data entity feature to generate a probability of a match. Thus, in some embodiments, the entity engine 150 utilizes, e.g., a classifier to classify entities and matches based on a probability. In some embodiments, the classifier may include, e.g., random forest, gradient boosted machines, neural networks including convolutional neural network (CNN), among others and combinations thereof. Indeed, in some embodiments, a gradient boosted machine of an ensemble of trees is utilized. In some embodiments, the classifier may be configured to classify a match where the probability of a match exceeds a probability of, e.g., 90%, 95%, 97%, 99% or other suitable probability based on the respective data entity feature vectors.

In some embodiments, an entity merge engine 160 receives the candidate matches and the respective probability scores as determined by the entity engine 150. In some embodiments, the entity merge engine 160 may include, e.g., a memory having instructions stored thereon, as well as, e.g., a buffer to load data and instructions for processing, a communication interface, a controller, among other hardware. A combination of software and hardware may then be implemented by the entity merge engine 160 in conjunction with the processor 105 or a processor dedicated to the entity merge engine 160 to implement the instructions stored in the memory of entity merge engine 160.

In some embodiments, the entity merge engine 160 may select candidate matches from the set of candidate matches based on a threshold probability score, e.g., greater than or equal to 0.5, 0.6, or other suitable threshold. Thus, a refined set of best matching pairs can be produced that reduces the risk of false positives. In some embodiments, the entity merge engine 160 may then merge groups of best matching pairs by clustering best matching pairs together using, e.g., clustering algorithms, such as graph algorithms including, e.g., connected components algorithms, to produce matching clusters based on the probability scores of best matching sets. In some embodiments, each matching cluster may then be merged into as single entity record that removes redundant data in the records forming the cluster. Accordingly, a set of matching first source records 108 and second source records 109 may be resolved as related to a common entity and be represented in, e.g., a table, list, or other entity resolution data structure. For example, the entity engine 150 may produce a table having a column for each entity in a set of matching records with each record being listed in a row. The table may include one or more additional columns to list data items from each record of the first source records 108 and the second source records 109 associated with the entity in row. In some embodiments, the entities are represented in rows with associated data specified in columns. In some embodiments, rather than a table, each entity forms a record including a file containing the data from each of the records matching the entity. Other structures and links between records are also contemplated.

In some embodiments, each entity record structures representing data from all first source records 108 and second source records 109 matching a given entity may be stored in the merged record database as described above. In some embodiments, the first source data base 106 is the merged record database, thus entity-related data from first source records 108 and second source records 109 from a given entity may be merged into an associated existing or new record in the first source database 106. The first source database 106 is thereby updated with entity-related data from the second source database 107 in an efficient manner with fewer processing instructions, shorter runtime, and reduced redundancy in records.

Figure 2:
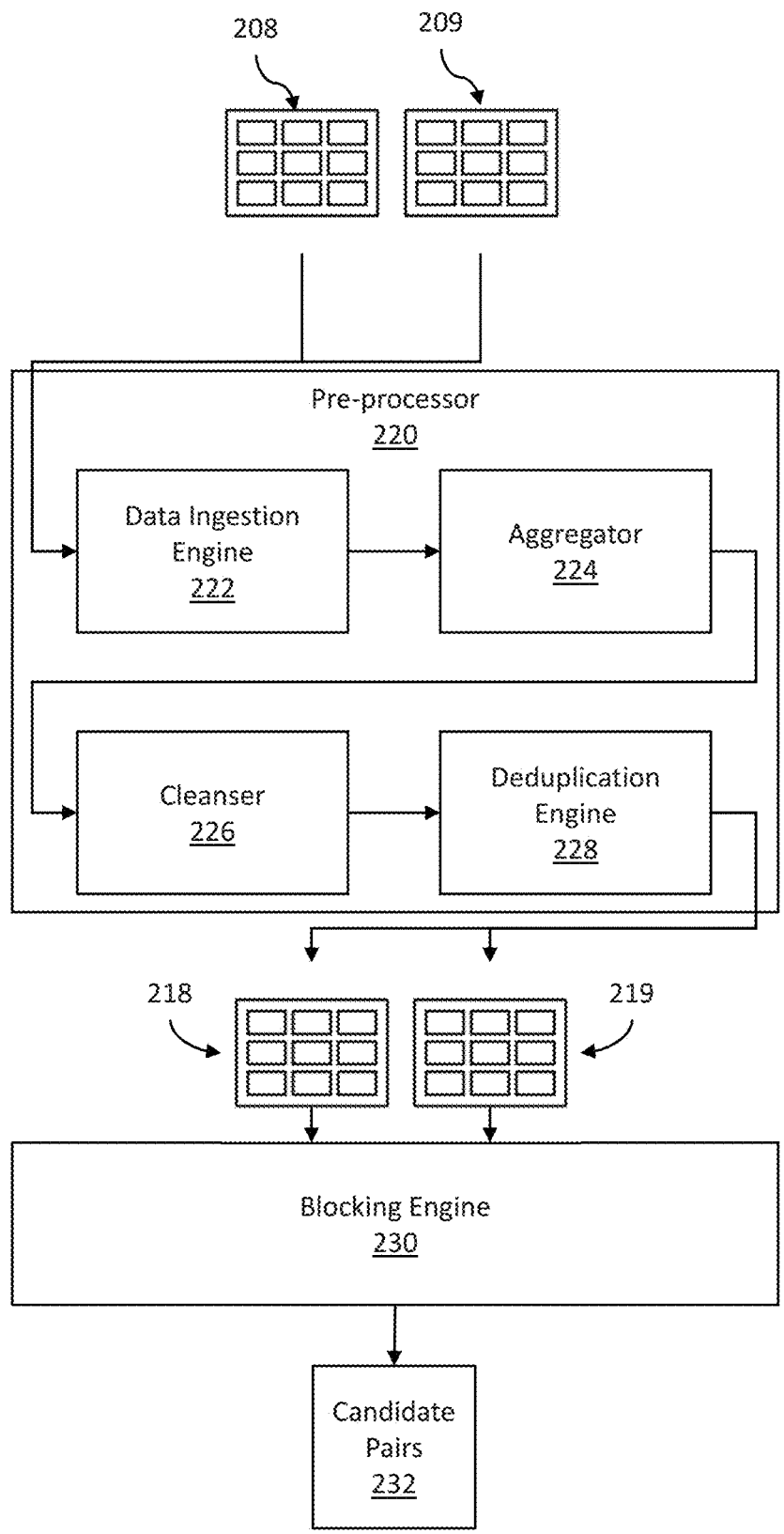

FIG. 2 is a block diagram of an illustrative pre-processor and blocking engine of another illustrative computer-based system for entity resolution in accordance with one or more embodiments of the present disclosure.

In some embodiments, an entity evaluation system for entity resolution and activity aggregation and indexing, such as, e.g., the entity evaluation system 100 above, may include the pre-processor 120 and the blocking engine 130 described above, such as, e.g., a pre-processor 220 and a blocking engine 230. In some embodiments, first source records 208 and second source records 209 are provide to the pre-processor 220 for ingestion, aggregation, cleansing and deduplication.

In some embodiments, a data ingestion engine 222 of the pre-processor 220 receives the first source records 208 and the second source records 209, each including, e.g., entity information. In some embodiments, the data ingestion engine 222 receives the raw data from a database, such as, e.g., a local database, a remote database, a cloud storage, or other data store. In some embodiments, the raw data may include, e.g., character strings, images, text files, or other unstructured data. Thus, in some embodiments, the data ingestion engine 220 parses the raw data to identify data items and form structured data including, e.g., quantity data items representing quantities associated with a record, date data item representing dates associated with each record, entity data items representing entities associated with each data item, location data items representing a location of each entity, among other data items. For example, the data ingestion engine 220 may employ a combination of character recognition to identify alphanumeric characters, and semantic segmentation to identify information represented by the characters, including, e.g., neural networks and other classifiers for semantic segmentation. However, in some embodiments, the data ingestion engine 220 employs delimiter-based parsing or fixed-length parsing, or combinations thereof, to parse data items from the raw data.

In some embodiments, upon aggregating the records, a cleanser 226 may cleanse the records. In some embodiments, the cleanser 226 utilize rule-based detection to, e.g., detect that records associated with known entities are captured correctly. Additionally, the cleanser 226 removes anomalous and unnecessary information to provide a uniform format of the data of each record.

In some embodiments, the cleansed data may be provided to a deduplication engine 228 to remove any duplicate information. In some embodiments, the deduplication engine 228 may generate a table with columns for, e.g., the cleansed name, cleansed zip code, cleansed city, state, or other fields and combinations thereof to construct a row for each cleansed record. The columns of each row may be used to generate a cleansed identifier (ID) by, e.g., forming a character string of the data of each column. Records may then be aggregated by, e.g., summing associated quantities, increasing a count number, or other aggregation technique, to combine duplicated cleansed IDs and reduce the number of records.

In some embodiments, the blocking engine 230 may receive the first record table 218 and the second record table 219 to, e.g., generate candidate matching sets of entities between the tables. In some embodiments, the blocking engine 230 compares each row in the second record table 219 to all entities in the first record table 218 using a heuristic search. Using the heuristic search based on each entity in each table, potentially matching may be determined. For example, the heuristic search may search the first record table 218 using, e.g., the telephone number and name of each entity in the second record table 219.

In some embodiments, a rule-based similarity measure is used to match entities from the first record table 218 and entities from the second record table 219. Similar to the heuristic search, the rule-based similarity measure may compare the entity information between each permutation of pairs of first records and second records utilize a set of similarity measures. For example, the similarity measures may include, e.g., an entity name soundex similarity, an address similarity, a zip code similarity, a latitude-longitude similarity, a phone number similarity, a business name character trigram similarity, an entity name to owner or executive name character trigram similarity, an executive (e.g., an executive of a business entity) last name similarity, industry descriptor or categorization similarity, among other similarity measures and combinations thereof. In some embodiments, multiple measures are used and combined to form a similarity measure between each pair. For example, each measure may be, e.g., summed to form a cumulative measure, weighted and summed, averaged, weighted and averaged, or other technique for combining the similarity measures.

In some embodiments, to reduce processing operations and permutations of record pairs, Minhash may be employed to determine likely matches without a need to assess each potential pair individually. Thus, in some embodiments, a Minhash of each entity, e.g., a name of each entity, in each of the first record table 218 and the second record table 219 is determined. In some embodiments, the blocking engine 230 may determine a Minhash for each entity multiple times, e.g., three times, five times, ten times, or other suitable number of times, to reduce the risk of false negatives. In some embodiments, each entity in the first record table 218 and the second record table 219 may be Minhashed using a common random key for each Minhash iteration. Once the entire set of entities is Minhashed for a given Minhash iteration, the hash values are compared to identify matches.

In some embodiments, Minhash matches may be filtered using, e.g., a Jaccard similarity between each pair of entities having a matching Minhash. In some embodiments, the Jaccard similarity may measure the similarity between, e.g., entity names. Thus, false positives can be removed from the blocked set of entity pairs having matching Minhashes in a Minhash iteration by removing the pairs from the set that have a low similarity according to the Jaccard similarity. For example, where the Jaccard similarity for a pair of entities is below a similarity threshold, the pair may be removed from the blocked set of entity pairs. In some embodiments, the similarity threshold may be a Jaccard value of about, e.g., 0.7, 0.8, 0.9, or other suitable threshold. The similarity threshold may be predefined or user selectable based on the entity resolution task. In some embodiments, where false positives are determined to be more harmful than false negatives for inclusion in the blocking set, the threshold may be increased (e.g., about 0.9 or greater). However, where false positives are determined to be less harmful, the threshold may be decreased (e.g., about 0.7 or less). In some embodiments, the Jaccard similarity threshold may be about 0.2 to balance false positives against false negatives, with an emphasis on reducing false positives to reduce unnecessary subsequent analysis on entity pairs having dissimilar entity names, thus reducing computational resources for entity resolution.

The above described process is repeated for each Minhash iteration, where each iteration is the hashing of the entire set of records with a common random key and filtering the candidate pairs according to Jaccard similarity. Thus, entity records may be blocked into candidate pairs based on an exact match between Minhashes without a need to explicitly compare every permutation of record pairs, thus reducing computations and computation time.

In some embodiments, to reduce the possibility of missing a possible pair using Minhash, Minhash may be combined with one or both of the heuristic search and rule-based algorithm to form a similarity measure between each pair. For example, each measure may be, e.g., summed to form a cumulative measure, weighted and summed, averaged, weighted and averaged, or other technique for combining the similarity measures.

In some embodiments, the blocking engine 230 may generate candidate sets of entity record pairs between the first record table 218 and the second record table 219. In some embodiments, the candidate pairs 232 may be represented in a table, in linked files, in lists, in arrays, or in any other suitable data structure for representing paired records.

Figure 3:
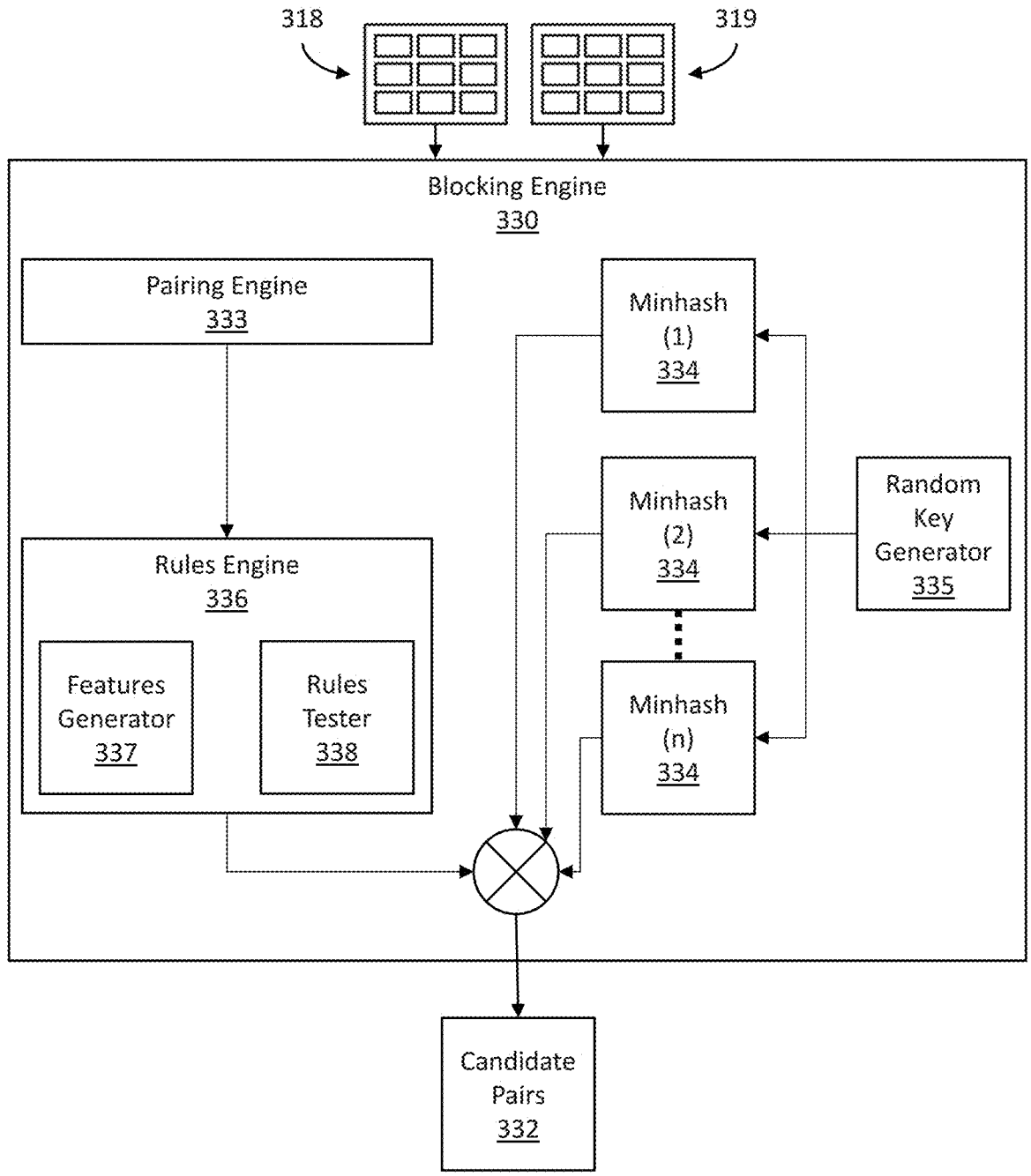

FIG. 3 is a block diagram of an illustrative blocking engine of another illustrative computer-based system for entity resolution in accordance with one or more embodiments of the present disclosure.

In some embodiments, a blocking engine 330 such as the blocking engine 230 described above, may receive a first record table 318 of first source records and a second record table 319 of second source records that represent entities and related entity data in each record. As an initial filter for identifying potentially matching pairs of records, the blocking engine 330 may form candidate pairs of similar records where each pair includes a first source record and a second source record. In some embodiments, the blocking engine 330 includes two parallel blocking components to reduce the risk of false negative pairings while also maintaining efficient blocking with reduced computations.

In some embodiments, the blocking engine 330 may include a pairing engine 333 that receives the first record table 318 and the second record table 319 and creates a pair for every combination of a first source record paired with a second source record. In some embodiments, a separate data structure is produced identifying the pair. However, in some embodiments, the pair engine 333 operates as a buffer that iteratively pairs each successive, e.g., first source record, with every second source record, and provides each pair to a rules engine 336 in time with the rules engine 336 processing a given pair.

In some embodiments, the blocking engine 330 processes the first record table 318 and the second record table 319 and each possible pair with a rules engine 332 that tests every possible pairing of a first source record with a second source record against a set of rules. To maintain efficiency, the performance costs of testing every possible pair can be mitigated by using simple, deterministic rules that are quickly and efficiently tested.

In some embodiments, each pair of all possible pairings of a first source record with a second source record is tested for an exact match across multiple features. In some embodiments, the features include, e.g., entity name soundex (e.g., a phonetic representation of the entity name), latitude and longitude of each address, phone number, entity name character trigram, entity name executive (e.g., business executive) name character trigram, executive last name, among others and combinations thereof.

In some embodiments, to facilitate the comparing of features in each pair, the rules engine 336 may include a features generator 337. In some embodiments, the features generator 337 may receive the first records table 318 and the second records tables 319 and, for each entity record, extract, append, or otherwise determine the features including, e.g., entity name soundex (e.g., a phonetic representation of the entity name), latitude and longitude of each address, phone number, entity name character trigram, entity name executive (e.g., business executive) name character trigram, executive last name, telephone number, industry category or description (e.g., education, healthcare, food services, etc.), franchise indicator (e.g., a "1" to designate a franchise, or a "0" to designate not a franchise, or vice versa), among others and combinations thereof. In some embodiments, the features may be predetermined, however in some embodiments, the features may be user configurable.

In some embodiments, a rules tester 338 may compare the features of a first source record in a pair with the features in a second source record of that pair to determine any exact matches. In some embodiments, the rules engine 336 produces a candidate pair where the rules tester 338 identifies any one of the features has an exact match between the first source record and the second source record of a pair. However, in some embodiments, the rules tester 338 may be configured to identify candidate pairs where two or more of the features have exact matches between the records of the pair.

In some embodiments, candidate pairs 332 are generated based on a determination by the rules tester 338 of exact matches in features of the first source record and second source record of the possible record pairs. Because exact matches are easy and quick to identify, the rules engine 336 may quickly and efficiently test all possible pairs of records. However, such a mechanism does not take into account similarity other than exact matches, thus resulting in a potentially high risk of false negatives in identifying candidate pairs 332. Accordingly, in some embodiments, the results of the rules engine 336 may be combined with the results of Minhashing the first source records and the second source records.

In some embodiments, a parallel mechanism to the rules engine 336 is employed by the blocking engine 330 including Minhash modules 334. In some embodiments, Minhashing is used to identify a probability of a match between records of the first records table 318 and the second records table 319. In some embodiments, a first Minhash (1) 334 determines hash value for each record of the first records table 318 and the second records table 319 using a random key provided by a random key generator 335. Because the key is randomly generated, the Minhash (1) 334 approximates a random sample combination of records because, using a random key, the probability of any two records having a same hash value is related to the similarity between those two records. In particular, the probability of having the same hash value is equal to the Jaccard similarity between the two records. Thus, by hashing each record using Minhash (1) 334, similarity, rather than exact matching data, may be taken into account to determine matches. Thus, where records having matching hash values are identified by the Minhash (1) 334, the records are identified as a candidate pair 332.

However, because Minhash is a probability, there is a risk of false negatives when hashing one time. Thus, the probability of identifying most or all similar records improves by hashing multiple times. Therefore, in some embodiments, the first source records and the second source records may be hashed a second time with Minhash (2) 334 similar to Minhash (1) 334. However, Minhash (2) 334 is provided with a new random key randomly generated by the random key generator 335. Using the new key, the hash values for each record will be different from Minhash (1) 334, thus further testing the similarity of records. The records with matching hash values may be identified as similar, and thus identified as candidate pairs 332, as described above. With each successive iteration of Minhash (n) 334 using randomly generated keys, confidence of having found all similar records increases. In some embodiments, the number of Minhash (n) 334 iterations may be, e.g., 2, 3, 5, 10 or more. However, as more iterations are added, computations increase and runtime increases. Thus, in some embodiments, three Minhashes 334 are used to balance runtime with confidence, however, other numbers of iterations are contemplated.

In some embodiments, the Minhash in each iteration is computed based on, e.g., entity name of each record. In some embodiments, the Minhash utilizes, e.g., an entity name character trigram, an entity name word trigram, an entity name word bigram, or other evaluation of entity name and combinations thereof. The entity name evaluation with the random key is then hashed to produce the Minhash value that can be compared with each other Minhash value of the various records of the first record table 318 and the second record table 319. Thus, in some embodiments, the Minhash 334 iterations account for entity name spelling variations without needed to directly compare every possible pair of a first source record and a second source record.

In some embodiments, the identified candidate pairs 332 from each Minhash 334 iteration and the rules engine 336 may be combined to produce a set of candidate pairs 332. The set of candidate pairs 332 are, therefore, quickly and efficiently identified using reduced computations while also maintaining broad coverage of similarity for reduced risk of false negatives. For example, in some embodiments, a set of first source records having 26 million records, and set of second source records having 14 million records would result in trillions of unique pairs. In such a scenario, the blocking engine 330 as described has been found to have produced a number of candidate pairs 332 on the order of billions, significantly fewer than the number of unique pairs. Moreover, the blocking engine 330 has done so with an 80% reduction in runtime, 95% reduction in cost, and 25% reduction in candidate pairs identified, when compared to other methods of blocking such as a search method.

Figure 4:
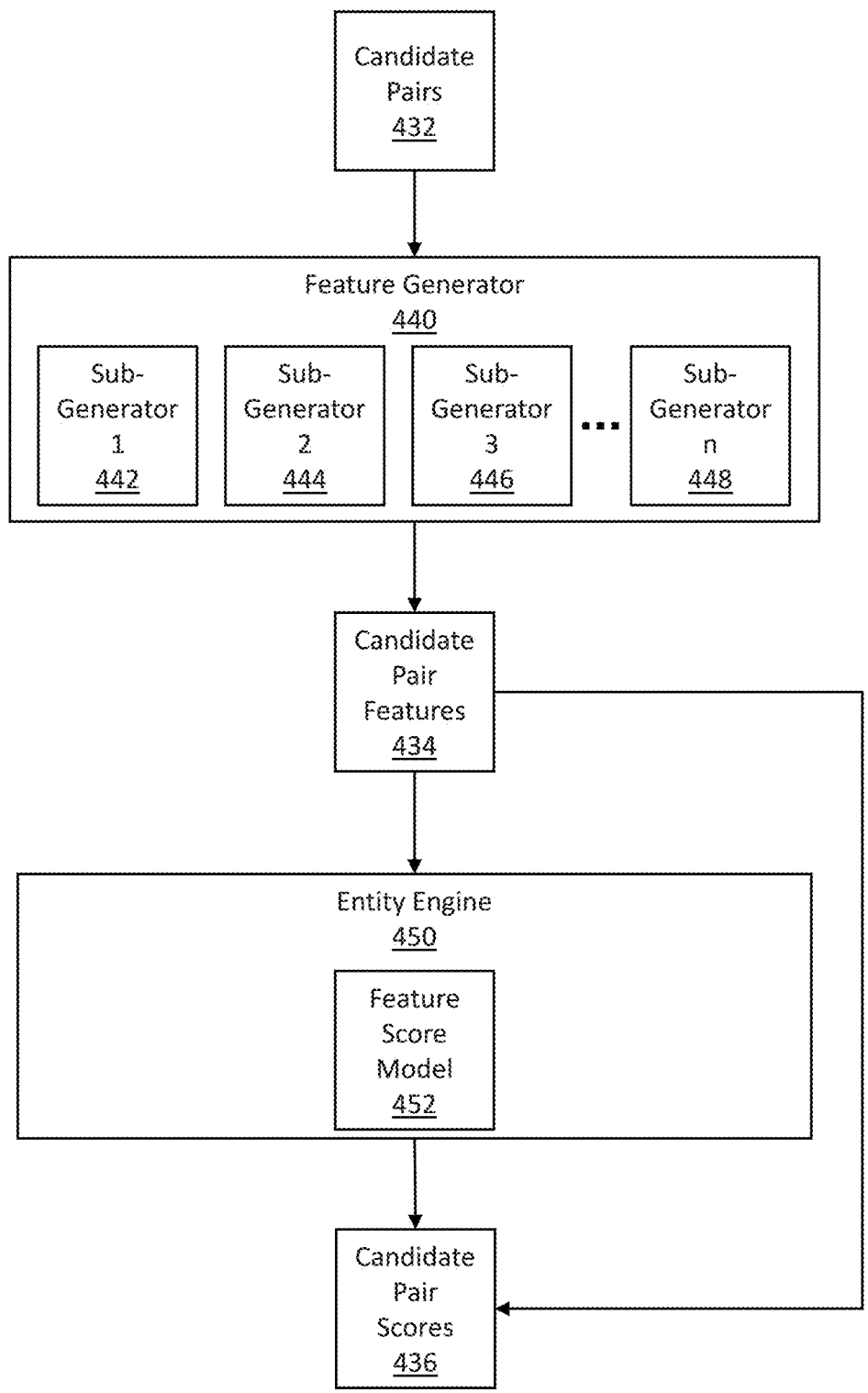

FIG. 4 is a block diagram of an illustrative feature generator and entity engine of another illustrative computer-based system for entity resolution in accordance with one or more embodiments of the present disclosure.

In some embodiments, a feature generator 440 receives the candidate pairs 432 to generate quantitative features characterizing each pair so that an entity engine 434 may determine an existence of a match from each candidate pair 432. In some embodiments, the feature generator 440 compares each activity in the candidate pair to an associated entity of the candidate pair to determine a quantitative representation of a similarity between, e.g., each entity data item represented by the records of the candidate pairs 432. For example, the feature generator 440 may compare the entity names in each entity of each candidate pair 432, a location (e.g., zip code) of each entity of each candidate pair 432, a representation of a sound of the entity name (e.g., a name soundex) of each entity of each candidate pair 432, among data items and combinations thereof.

In some embodiments, the feature generator 440 includes multiple sub-generators 442 through 448. Each of the sub-generators 442 through 448 may generate a feature vector representative of a different type of comparison of the activity and entity of the pair. For example, sub-generator 1 442 may determine a distance, such as Jaccard distance between each entity, sub-generator 2 444 may determine an n-gram similarity, sub-generator 4, 446 may determine a Jaro-Winkler distance, with additional generators through sub-generator n 448. In some embodiments, the feature generator 440 may have sub-generators 442 through 448 to generate one or more features for each candidate pair 432, examples of which are as follows:

In some embodiments, one or more of the sub-generators 442 through 448 generates a feature vector using, e.g., 2,3,4-character n-gram similarity between, e.g., each entity name, each zip code, each name soundex, etc.

In some embodiments, each sub-generator 442 through 448 utilizes, e.g., Jaccard similarity to determine, e.g., the n-gram similarity of the sub-generators 442 through 448 described above. In some embodiments, the Jaccard similarity coefficient between n-gram sets of each entity name is calculated as the size of the intersection of the two sets divided by the size of their union. This gives results in a continuous feature in the range [0, 1].

However, in some embodiments, one or more of the sub-generators 442 through 448 utilizes a different similarity measure, such as, e.g., Levenshtein distance between, e.g., each entity name, each zip code, each name soundex, etc.

In some embodiments, one or more of the sub-generators 442 through 448 generates a feature vector using, e.g., Jaro distance between each entity name. The Jaro similarity accounts for strings that contain matching characters that appear in different sequence order that are not far from each other. This feature facilitates a fuzzy match between the name strings.

In some embodiments, one or more of the sub-generators 442 through 448 generates a feature vector using, e.g., an official name indicator. This is a Boolean feature describing whether or not the entity names of each candidate pair 432 include, e.g., a suffix that indicates an official or legal entity name. For example, in some embodiments, some entity names may be followed by a suffix, such as, e.g., Inc., Corp., LLC, LLP, Incorporated, Corporation, etc. One or more of the sub-generators 442-448 may include, e.g., a text recognition function configured to recognize a legal entity designation, e.g., by comparing portions of the entity names to a library of legal entity designations, and set a flag (e.g., recording a data item such as, e.g., "legal name=1"), to indicate that the entity name includes a legal entity designation, thus indicating an official name. Where official or legal names match between entity names of a candidate pair 432, address and other information need not be compared. Thus, analysis according to other features may be limited to candidate pairs 432 having matching unofficial names (e.g., "legal name=0").

In some embodiments, one or more of the sub-generators 442 through 448 generates a feature vector using, e.g., zip code counts. In some embodiments, some entities may have records recording multiple zip codes for locations (e.g., for businesses with multiple offices, addresses, or other locations). One or more of the sub-generators 442 through 448 may tally the number of zip codes assigned to each entity in the candidate pair 432 and compare the zip code counts between the entities. In some embodiments, zip code counts may be used to measure similarity (e.g., similar numbers of zip codes) or to set a Boolean indicator that indicates whether each entity is a multi-location entity, such as, e.g., a franchise, a chain, an interstate business or organization, etc.

In some embodiments, one or more of the sub-generators 442 through 448 generates a feature vector using, e.g., a healthcare organization and healthcare professional pair of entities using, e.g., entity name parsing or industry descriptions or both. For example, for one pair, a first entity name or industry description may identify the first entity as a hospital (e.g., using Standard Industry Classification (SIC) codes), while the second entity name may identify the second entity as a doctor (e.g., using SIC codes). Although there is no common word between these two entity names, the one or more of the sub-generators 442 through 448 may identify the entity pair as a hospital-doctor pair, and test the similarity of addresses for each entity in the candidate pair 432. Where the entities of the candidate pair 432 have similar addresses, the one or more feature generators 442 through 448 may set a flag to indicate a relationship of the candidate pair 432 as a doctor working at a hospital (e.g., setting an indicator to equal 1).

Other measures of feature vectors form the candidate pairs 432 are also contemplated. Using the features from the sub-generators 442 through 448, the feature generator 440 may construct a feature vector for each pair in the candidate pairs 432 to produce candidate pair features. Each feature may be individually appended to an associated pair in the candidate pairs 432, or the features may be combined into a feature vector, which may then be appended to the associated pair in the candidate pairs 432. In some embodiments, the candidate pairs 432 and candidate pair features 434 may be stored in, e.g., a database or memory 404, such as, e.g., the memory 104 of the illustrative entity evaluation system 100 described above.

In some embodiments, an entity engine 450, such as the entity engine 150 described above, may receive the candidate pair features 434. In some embodiments, the entity engine 450 uses the candidate pair features 434 to determine a probability of a match between the entities in the associated candidate pair 432 based on a score predicted for the features. In some embodiments, the entity engine 450 employs an entity matching machine learning model, such as, e.g., a gradient boosted machine 452 to score a candidate pair 432 based on the candidate pair features 434.

In some embodiments, the gradient boosted machine 452 receives the candidate pair features 434 as an input pair, with the output being a probability of a match for the pair. In some embodiments, the gradient boosted machine 452 may then use a series of classifier decision trees to evaluate a similarity between the entity data items of each candidate pair using the associated features to produce the probability of a match.

In some embodiments, the gradient boosted machine 452 determines the scores using hyper-parameters in, e.g., an Xgboost algorithm tuned via training with known, ground-truth input-output pairs of activities and entities. For example, in some embodiments, hyper-parameter tuning is performed using cross-validation and grid search. In some embodiments, the tuning parameters may include, e.g., Max_depth, Min_child_weight, Reg_lambda, among others. In some embodiments, Max_depth includes a maximum depth of a tree. Increasing this value may make the model more complex and more likely to overfit. In some embodiments, tuning explored values in a grid search process including, e.g., 4, 6, 8, 10. In some embodiments, Min_child_weight includes a minimum sum of instance weight (hessian) needed in a child. If the tree partition step results in a leaf node with the sum of instance weight less than min_child_weight, then the building process ceases further partitioning. In a linear regression task, this simply corresponds to the minimum number of instances needed to be in each node. The larger min_child_weight is, the more conservative the algorithm may be. In some embodiments, tuning explored values in a grid search process including, e.g., 1, 4, 5. In some embodiments, Reg_lambda includes an L2 regularization term on weights. Increasing this value may make model more conservative. In some embodiments, tuning explored values in a grid search process including, e.g., 0.01, 0.1, 1.

Additionally, in some embodiments, the gradient boosted machine 452 employs early stopping. Therefore, in some embodiments, for any combination of the above hyper-parameters, the number of trees is increased up to a point where an increase in the number of trees fails to improve a cost function. This way, excessively increasing the number of trees is avoided to avoid overfitting. In some embodiments, the balance between accuracy, overfitting, and coverage can be expressed using measures of, e.g., mean precision, mean recall and mean coverage based on evaluation of a cost function employing cross-validation (e.g., five-fold cross validation) using the ground-truth input-output pairs.

In some embodiments, the gradient boosted machine 452 may then analyze the candidate pair features 434 to determine a candidate pair score 436. In some embodiments, the gradient boosted machine 452 processes the features with weak classifiers. Once the features are analyzed by one node including a weak classifier, the result is then analyzed by the next node in a branch of the tree, and repeated until the end of the branch is reached. This process occurs for each branch, resulting in many scores based on the number of trees and the number of branches. All of the results are combined, e.g., summed, to produce the candidate pair score 436 for each of the candidate pairs 432. In some embodiments, the candidate pair score 436 is correlated to a probability. Therefore, the candidate pair score 436 or the probability of a match may be appended to the table with the candidate pairs 432 along with the candidate pair features 434.

In some embodiments, the illustrative computer-based systems of the present disclosure may be configured to utilize one or more illustrative AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an illustrative neutral network technique may be one of, without limitation, feedforward neural network, radial basis function network, recurrent neural network, convolutional network (e.g., U-net) or other suitable network. In some embodiments and, optionally, in combination of any embodiment described above or below, an illustrative implementation of Neural Network may be executed as follows:
  i) Define Neural Network architecture/model,
  ii) Transfer the input data to the illustrative neural network model,
  iii) Train the illustrative model incrementally,
  iv) determine the accuracy for a specific number of timesteps,
  v) apply the illustrative trained model to process the newly-received input data,
  vi) optionally and in parallel, continue to train the illustrative trained model with a predetermined periodicity.

In some embodiments and, optionally, in combination of any embodiment described above or below, the illustrative trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the illustrative trained neural network model may also be specified to include other parameters, including but not limited to, bias values, bias functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the illustrative aggregation function may be a mathematical function that combines (e.g., sum, product, etc.) input signals to the node. In some embodiments and, optionally, in combination of any embodiment described above or below, an output of the illustrative aggregation function may be used as input to the illustrative activation function. In some embodiments and, optionally, in combination of any embodiment described above or below, the bias may be a constant value or function that may be used by the aggregation function or the activation function, or both, to make the node more or less likely to be activated.

Figure 5:
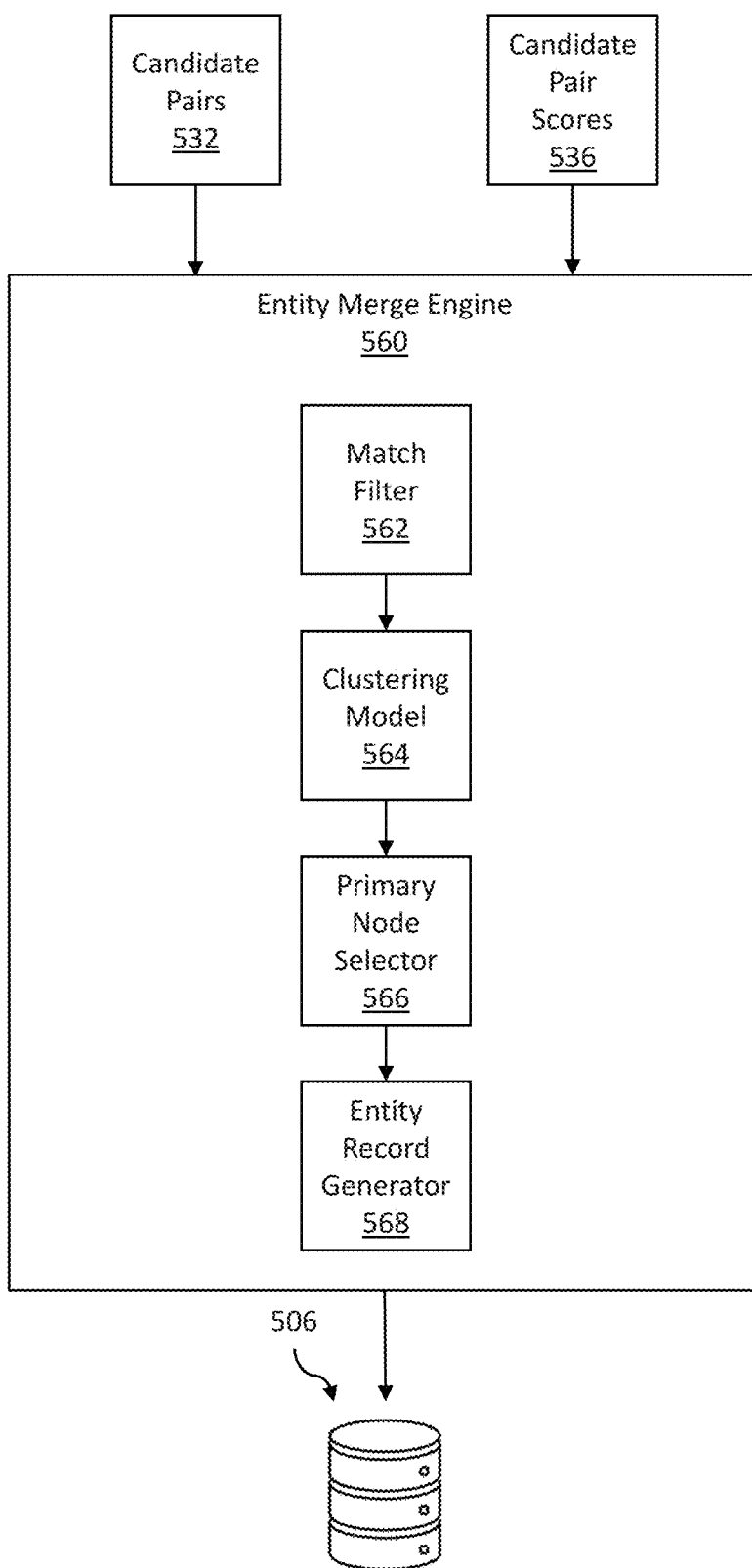

FIG. 5 is a block diagram of an illustrative entity merge engine of another illustrative computer-based system for entity resolution in accordance with one or more embodiments of the present disclosure.

In some embodiments, the candidate pairs 532 and the candidate pair scores 536 are received by an entity merge engine 560 to determine which of the candidate pairs 532 have matching entities. However, simply picking candidate pairs 532 having an associated score of a certainly magnitude does not account for multiple candidate pairs 532 all having a common entity. Accordingly, in some embodiments, the entity merge engine 560 employs a clustering model 564 to generate clusters of records based on the candidate pairs 532 and associated candidate pair scores 536 that groups records, rather than pairs records.

In some embodiments, the entity merge engine 560 employs an initial match filter 562 to remove non-matching pairs from the candidate pairs 532. The match filter 562 compares the candidate pair score 536 of each candidate pair 532 to a best match score threshold to produce a best matching set of pairs form the candidate pairs 532. In some embodiments, the best match score threshold is predetermined, however, it may alternatively be user configurable or learned using, e.g., a trained threshold prediction model that, e.g., is trained to regressively predict score thresholds. In some embodiments, the candidate pair scores 536 relate to a probability of a match. Thus, the higher the score, the greater the probability that the entities of the records are the same entity. Therefore, in some embodiments, the best match score threshold may be a value suitable to filter low probability matches, such as a value of about, e.g., 0.4, 0.5, 0.6, 0.7, or other suitable score threshold.

In some embodiments, the candidate pairs 532 may additionally or alternatively be filtered relative to each other pair. For example, all entity names represented in the candidate pairs 532 may be identified. In some embodiments, all candidate pairs 532, either before, after or instead of the best match score threshold filtering described above, that have a given entity of the identified entity names may be identified. For example, all candidate pairs 532 having entity "A" may be identified. Each of the candidate pairs 532 having the given entity may be compared against each other based on the respective candidate pair scores 536. The best matching pairs may be developed by keeping only the candidate pairs 532 of the given entity that have the highest candidate pair scores 536. In some embodiments, the process is repeated using each identified entity name as the given entity to iteratively determine the best matching pair for each entity in the candidate pairs 532. In some embodiments, this relative filtering is performed before the best match score threshold filtering described above to refine the best matching pairs. In some embodiments, this relative filtering is performed after the best match score threshold filtering described above to refine the best matching pairs. In some embodiments, this relative filtering is performed instead of the best match score threshold filtering described above.

In some embodiments, the best matching pairs may be provided to the clustering model 564 to group record pairs into groups having common entities. In some embodiments, the clustering model 564 employs, e.g., a graphing algorithm, such as a connected components algorithm, that identifies all of the best matching pairs to which a given record belongs. For example, a first record may be in a best matching pair with a second record, but also in a separate best matching pair with a third record. The clustering model 564 identifies the two best matching pairs as having the first record and clusters all of the first, second and third records into a group of matching records. Accordingly, each record from the first source records and the second source records that have a common entity are linked together based on the best matching pairs of first and second source records.

In some embodiments, the groups may be analyzed by a primary node selector 566. In some embodiments, an authoritative entity for each group of records may advantageously be determined. However, not all records in the group necessarily have an exact match of entity name. Thus, the primary node selector 566 identifies a record that has the authoritative name of the associated entity. In some embodiments, the primary node selector 566 analyzes each group and determine the record that has the most edges (e.g., the most connections to other records according to the best matching pairs). An entity name or record identifier associated with the record having the most edges is determined as the group identifier to identify the group of records as a whole.

Moreover, in some embodiments because different data qualities may exist in the different data sets, data sources may be ranked according to quality to identify the primary node. Thus, in some embodiments, the nodes may be analyzed by the primary node selector 566 to score data source quality. For example, in some embodiments, the primary node selector 566 may analyze each data field of each record in each cluster and evaluate the data fields against field-specific rules. For example, a telephone number field may include a rule for a ten-digit number, where the rule is violated where a ten-digit number is not found in the telephone number field. The data quality score may be the aggregate number of rule violation for each record, or a proportion of violations to total data fields, or any other suitable score method. The primary node may then be identified according to a combined score of the data source quality and the number edges of each node in a cluster. In some embodiments, the primary node is selected as the node having the highest combined score.

In some embodiments, once the groups and the associated group identifiers are determined, an entity record generator 568 merges all records in a group to generate a merged entity record for each group. In some embodiments, the entity record generator 568 generates, e.g., a table, where each row of the table includes data associated with a respective record of the group, such as, e.g., as illustrated in the example merged record of Table 1 below:

TABLE 1

| ID | Entity Name | Address | Exec Name | Phone No. |
| --- | --- | --- | --- | --- |
| dnb987654321 | First Company INC | 123 S. Main St., Tampa, FL | John Doe | 7418529630 |
| dnb357214689 | First Company | 3210 E US-92, Tampa, FL | John Doe | 7418529630 |
| ig951874632 | First Company INC | 123 S. Main St., Tampa, FL | John Smith | 7418529630 |

In some embodiments, record dnb789585804 was determined by the entity merge engine 560 to be in a best match pair with dnb35407094 and in a best match pair with ig424616128. As a result, the primary node selector 566 identified dnb789585804 as the primary node because it has two connections, whereas each of dnb35407094 and ig424616128 have one. Thus, the entity record generator 568 generates the record depicted in Table 1 above and places dnb789585804 in the first row with associated record data as the primary node and the group identifier.

In some embodiments, the merged records of each group may be merged back into, e.g., the first source database 506 or other suitable merged records database to generate a deduplicated set of records from multiple record sources.

Figure 6:
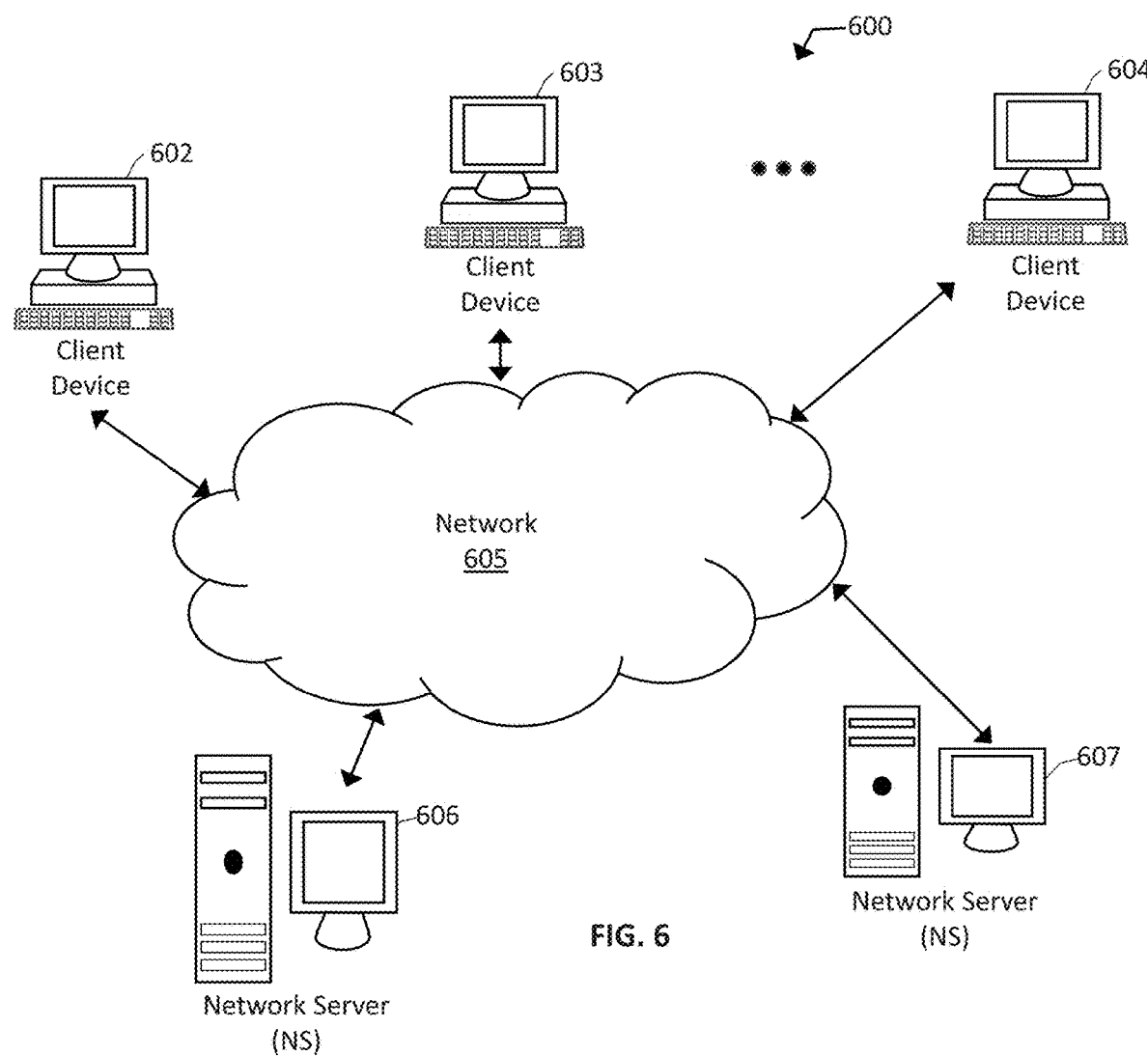

FIG. 6 depicts a block diagram of an illustrative computer-based system 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the illustrative computer-based system 600 may be configured to manage a large number of members and concurrent transactions, as detailed herein. In some embodiments, the illustrative computer-based system 600 may be based on a scalable computer and network architecture that incorporates varies strategies for assessing the data, caching, searching, and database connection pooling. An example of the scalable architecture is an architecture that is capable of operating multiple servers.

In some embodiments, referring for example to FIG. 6, members 602-604 (e.g., clients) of the illustrative computer-based system 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-!04 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and any other device that is equipped to communicate over a wired or wireless communication medium (e.g., NFC, RFID, NBIOT, 3G, 4G, 6G, GSM, GPRS, WiFi, WiMax, CDMA, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an illustrative specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ or other suitable programming language. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images, video, games or combinations thereof.

In some embodiments, the illustrative network 605 may provide network access, data transport and other services to any computing device coupled to it. In some embodiments, the illustrative network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the illustrative network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the illustrative network 605 may include and implement, as an alternative or in conjunction with one or more of the above, a WiMAX architecture defined by the WiMAX forum. In some embodiments and, optionally, in combination of any embodiment described above or below, the illustrative network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the illustrative network 605 may be transmitted based at least in part on one of more communication modes such as but not limited to: NFC, RFID, Narrow Band Internet of Things (NBIOT), ZigBee, 3G, 4G, 6G, GSM, GPRS, WiFi, WiMax, CDMA, satellite and any combination thereof. In some embodiments, the illustrative network 605 may also include mass storage, such as network attached storage (NAS), a storage area network (SAN), a content delivery network (CDN) or other forms of computer or machine-readable media.

In some embodiments, the illustrative server 606 or the illustrative server 607 may be a web server (or a series of servers) running a network operating system, examples of which may include but are not limited to Microsoft Windows Server, Novell NetWare, or Linux. In some embodiments, the illustrative server 606 or the illustrative server 607 may be used for and provide cloud and network computing. Although not shown in FIG. 6, in some embodiments, the illustrative server 606 or the illustrative server 607 may have connections to external systems like email, SMS messaging, text messaging, ad content providers, etc.

Any of the features of the illustrative server 606 may be also implemented in the illustrative server 607 and vice versa.

In some embodiments, one or more of the illustrative servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more illustrative computing member devices 602-604, the illustrative server 606, or the illustrative server 607, or both may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
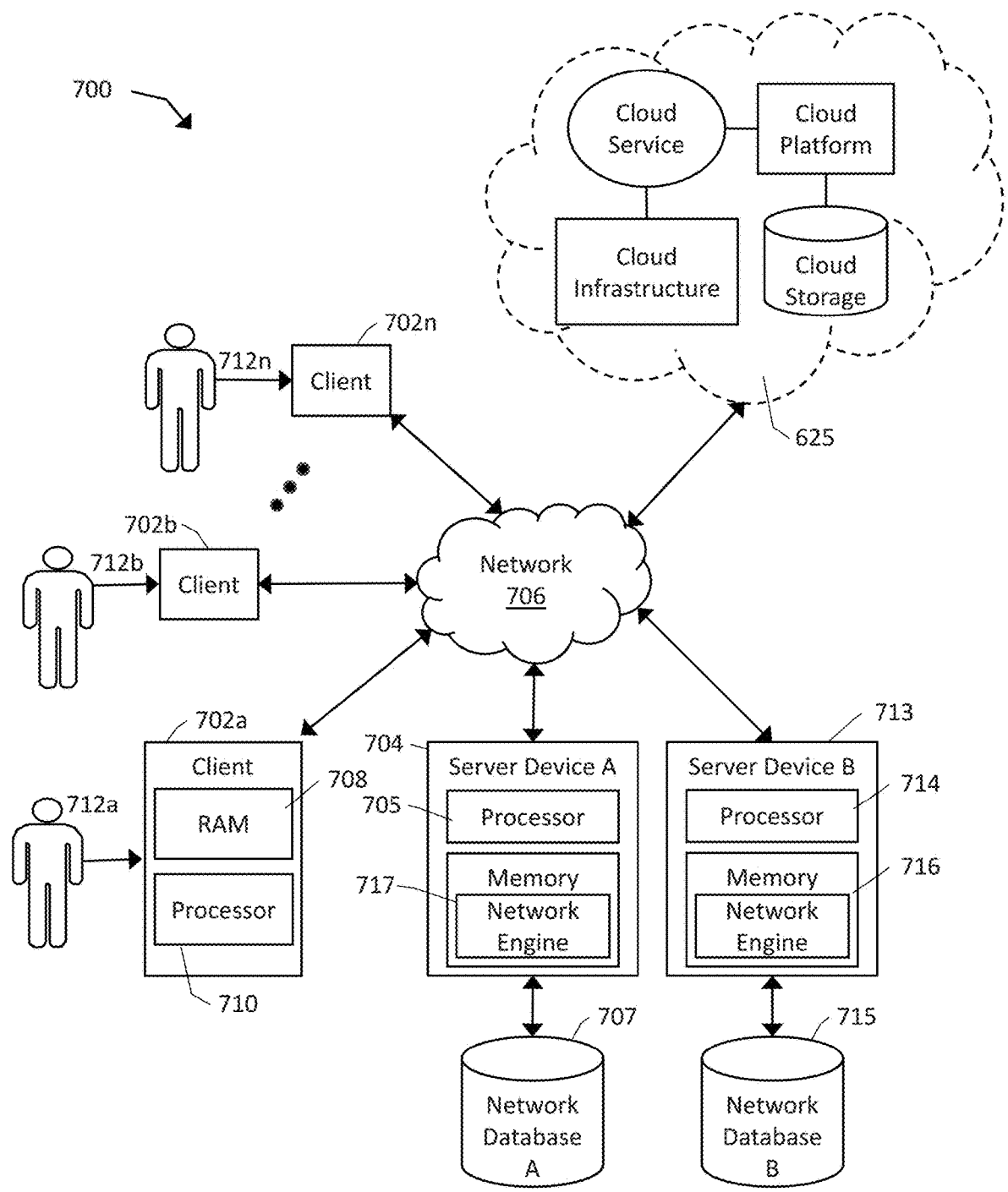

FIG. 7 depicts a block diagram of another illustrative computer-based system 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 702a through 702n may also comprise a number of external or internal devices such as a mouse, a CD-ROM, DVD, a physical or virtual keyboard, a display, a speaker, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™ Windows™, or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, or Opera. In some embodiments, through the member computing client devices 702a through 702n, users, 712a through 702n, may communicate over the illustrative network 706 with each other or with other systems and devices coupled to the network 706. As shown in FIG. 7, illustrative server devices 704 and 713 may be also coupled to the network 706. In some embodiments, one or more member computing devices 702a through 702n may be mobile clients.

In some embodiments, at least one database of illustrative databases 707 and 715 may be any type of database, including a database managed by a database management system (DBMS). In some embodiments, an illustrative DBMS-managed database may be specifically programmed as an engine that controls organization, storage, management, and retrieval of data in the respective database. In some embodiments, the illustrative DBMS-managed database may be specifically programmed to provide the ability to query, backup and replicate, enforce rules, provide security, compute, perform change and access logging, and automate optimization. In some embodiments, the illustrative DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the illustrative DBMS-managed database may be specifically programmed to define each respective schema of each database in the illustrative DBMS, according to a particular database model of the present disclosure which may include a hierarchical model, network model, relational model, object model, or some other suitable organization that may result in one or more applicable data structures that may include fields, records, files, or objects. In some embodiments, the illustrative DBMS-managed database may be specifically programmed to include metadata about the data that is stored.

Figure 8:
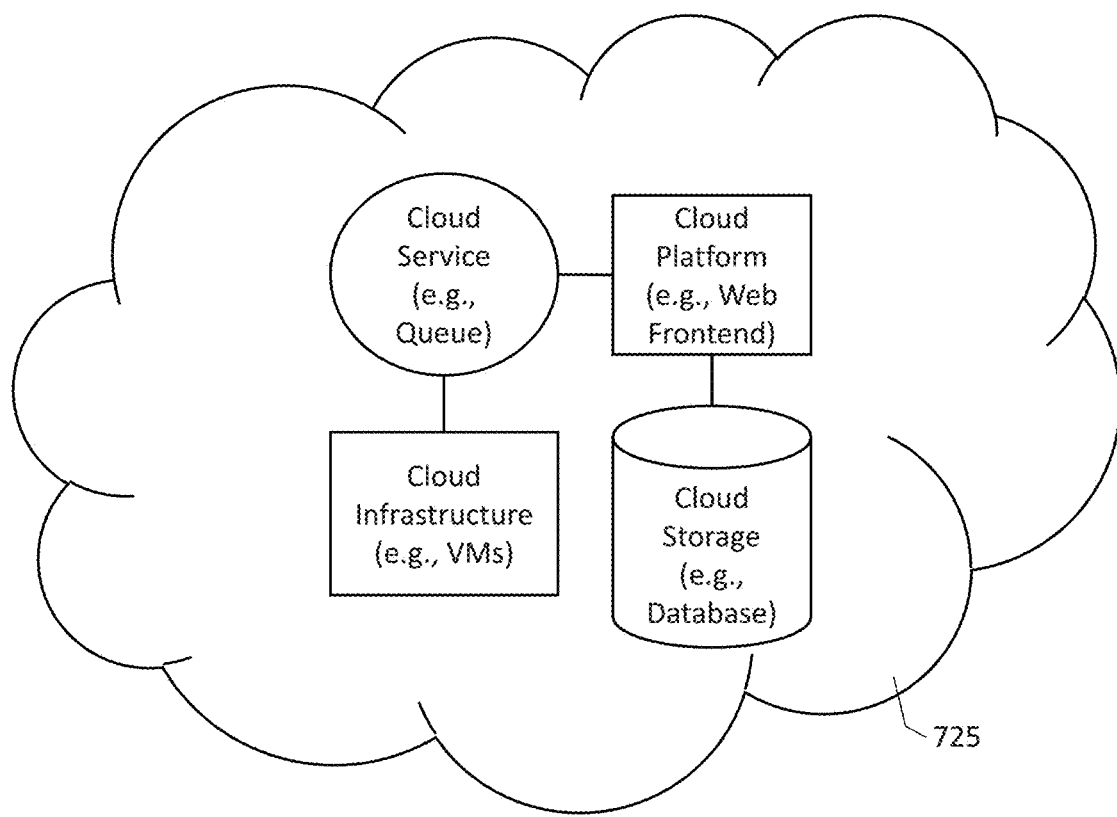
Figure 9:
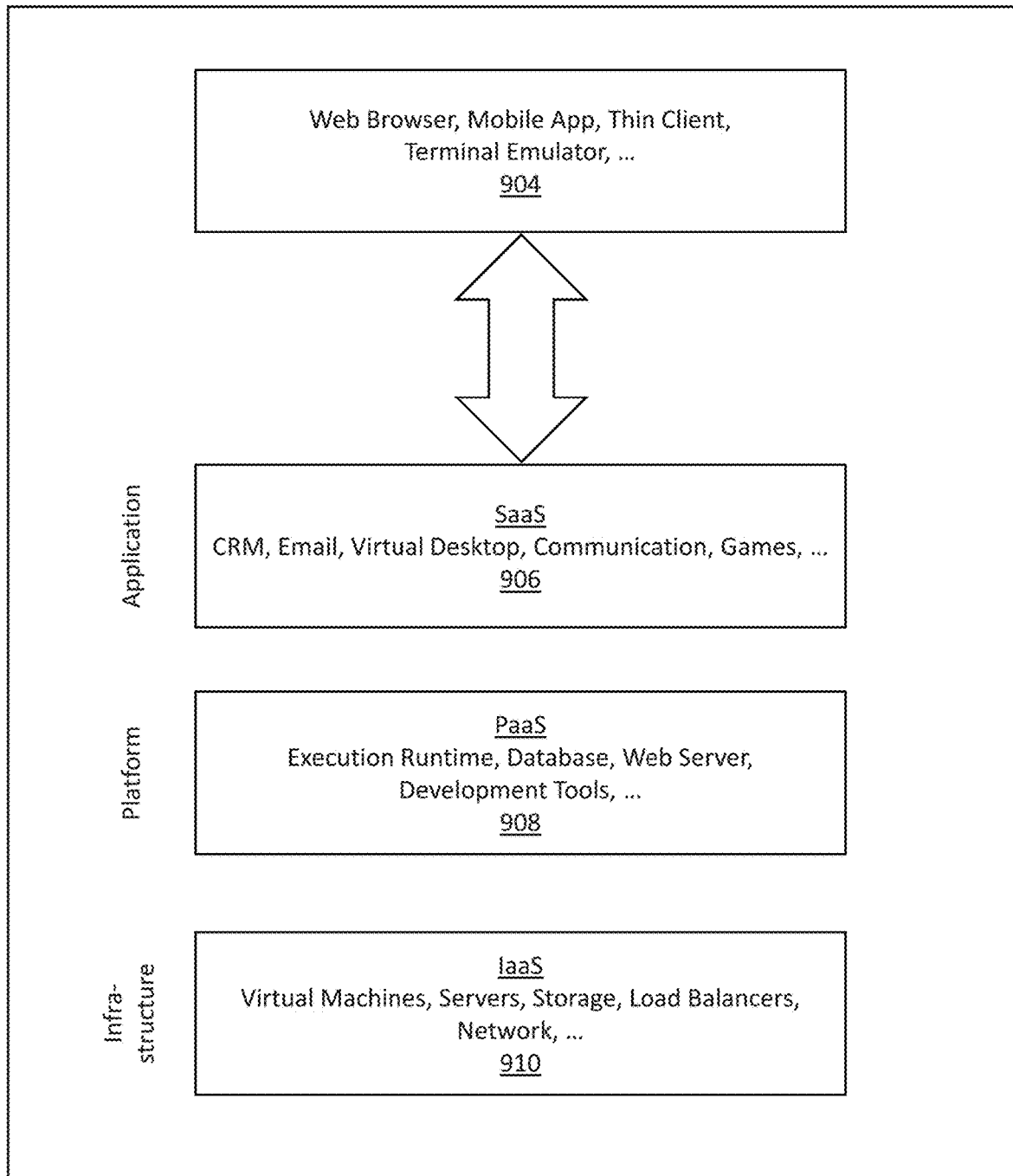

In some embodiments, the illustrative computer-based systems of the present disclosure may be specifically configured to operate in a cloud computing architecture such as, but not limiting to: infrastructure a service (IaaS), platform as a service (PaaS), or software as a service (SaaS). FIGS. 8 and 9 illustrate schematics of illustrative implementations of the cloud computing/architecture(s) in which the illustrative computer-based systems, the illustrative computer-based devices, and the illustrative computer-based components of the present disclosure may be specifically configured to operate.

Figure 10:
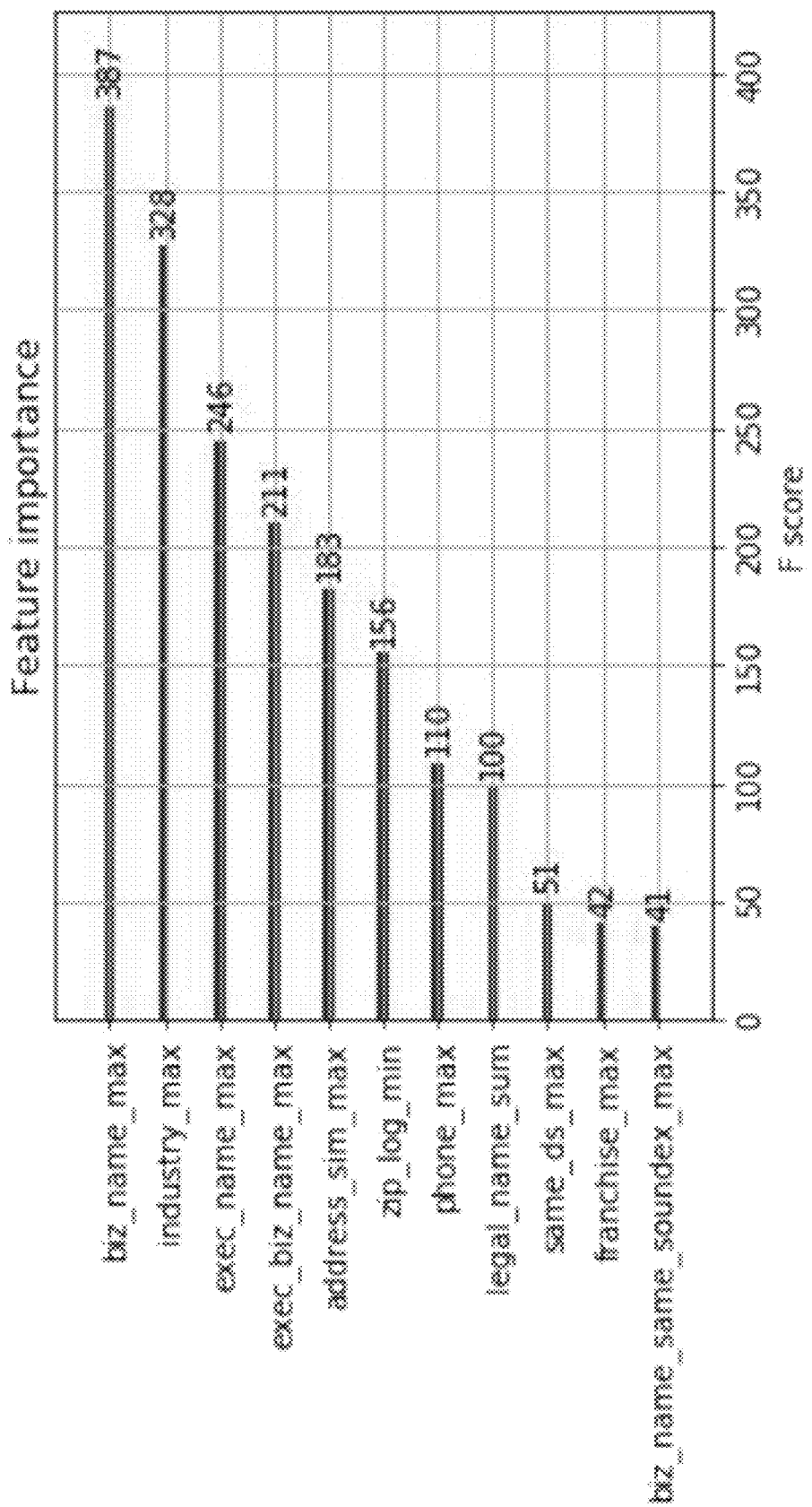

FIG. 10 is a diagram of results of feature importance testing for entity resolution in accordance with one or more embodiments of the present disclosure. Using a ground-truth set of records for entity resolution, an F score was computed for each feature in match scoring using, e.g., the feature core model 452 described above based on an error of the feature score model 452.

Figure 11:
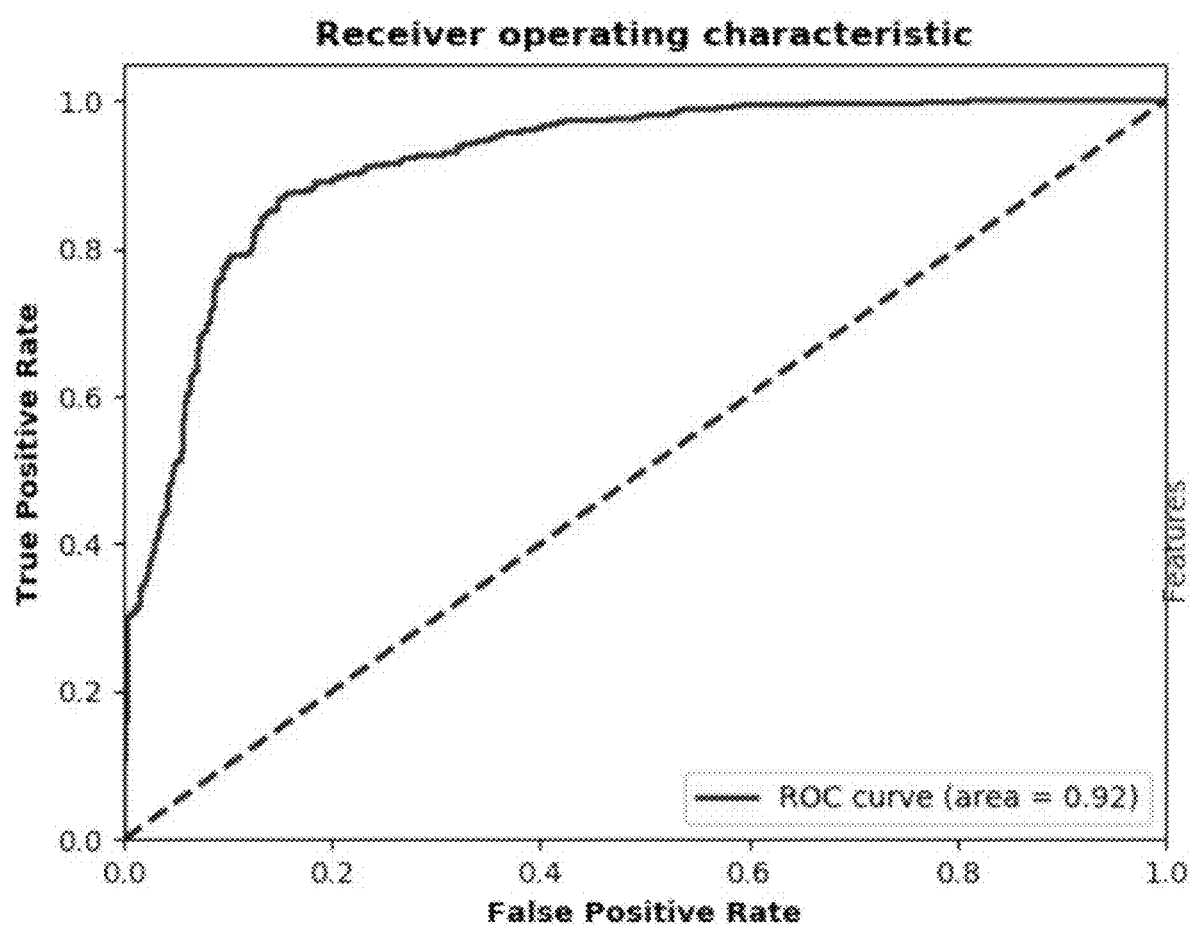
Figure 12A:
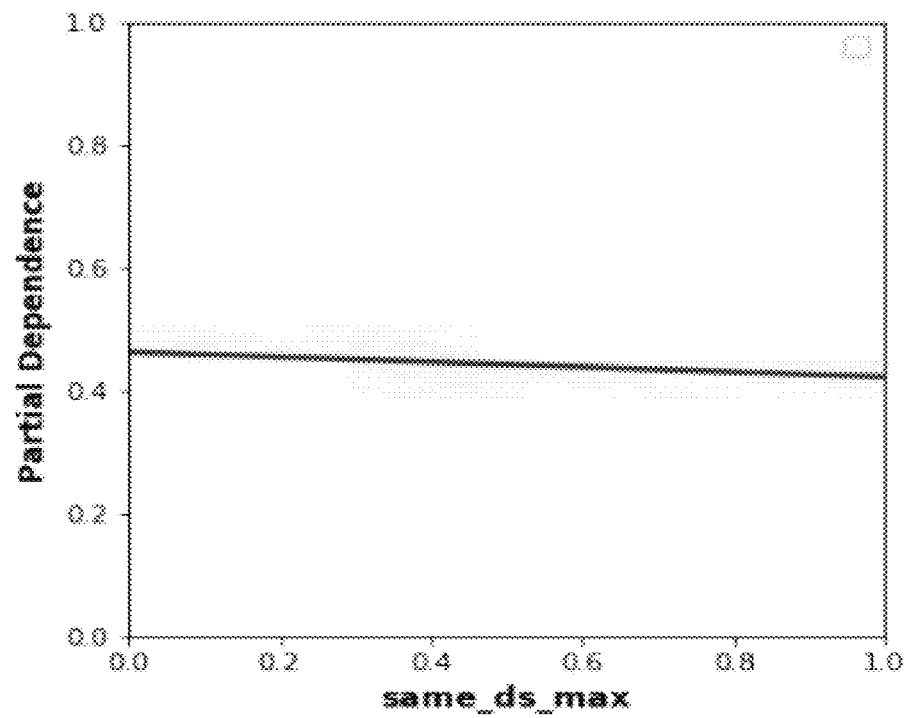
Figure 12B:
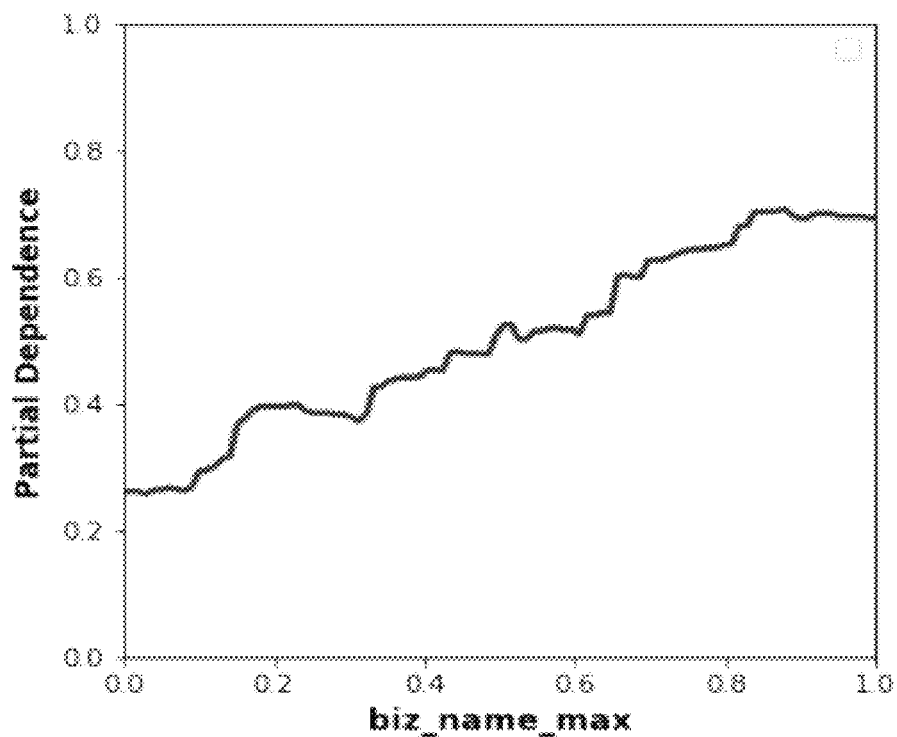
Figure 12C:
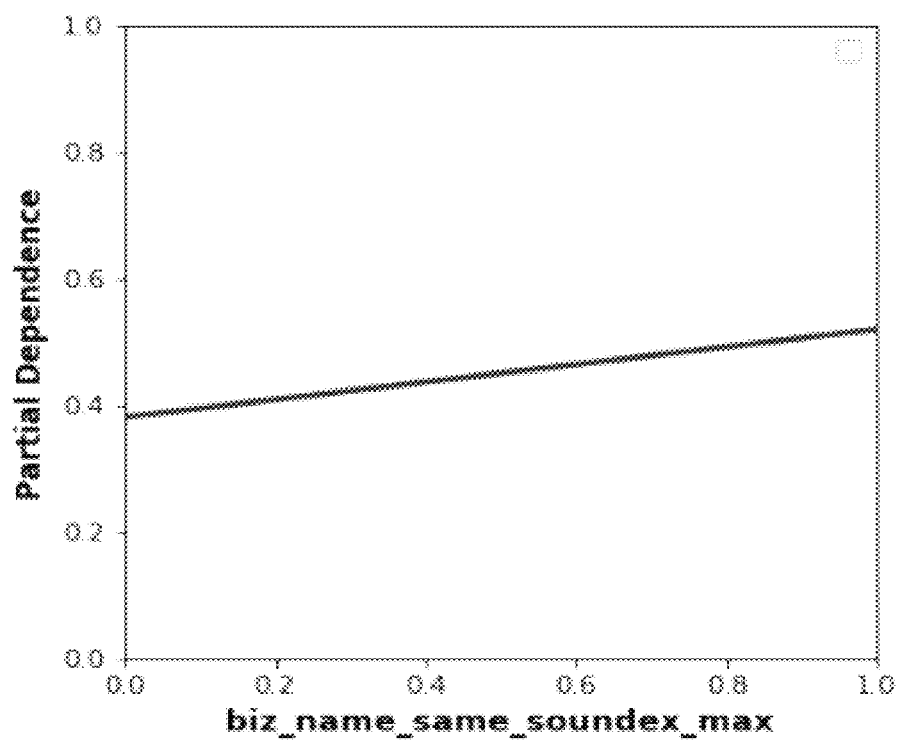
Figure 12D:
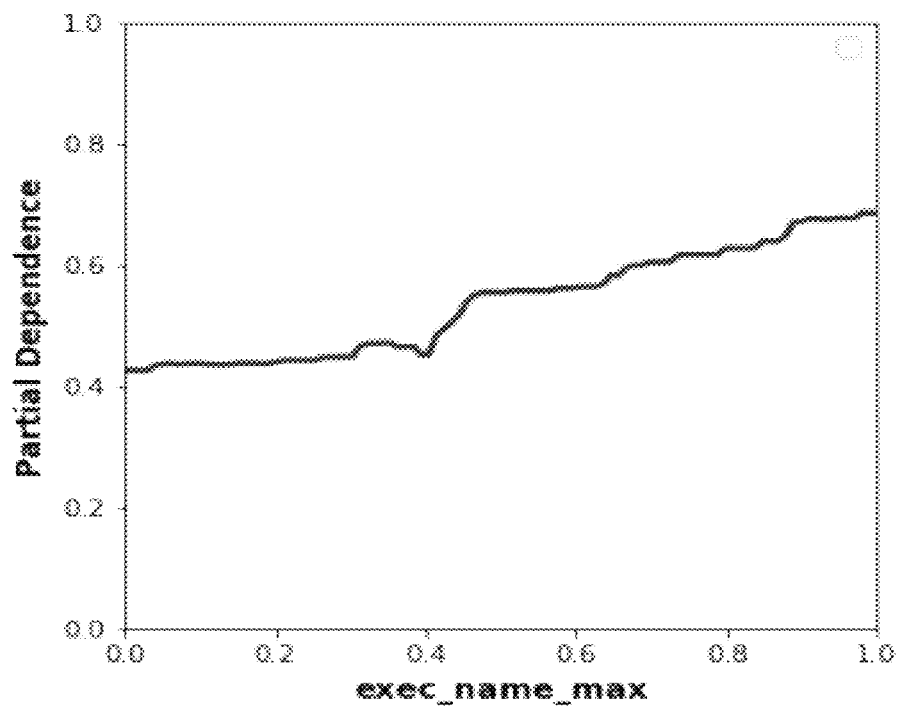
Figure 12E:
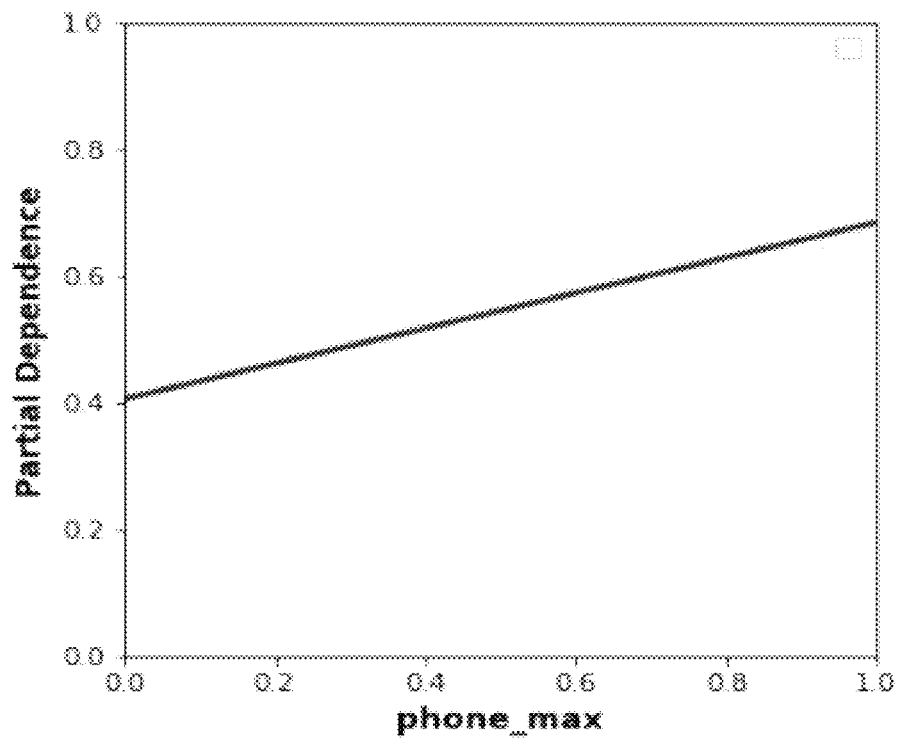
Figure 12F:
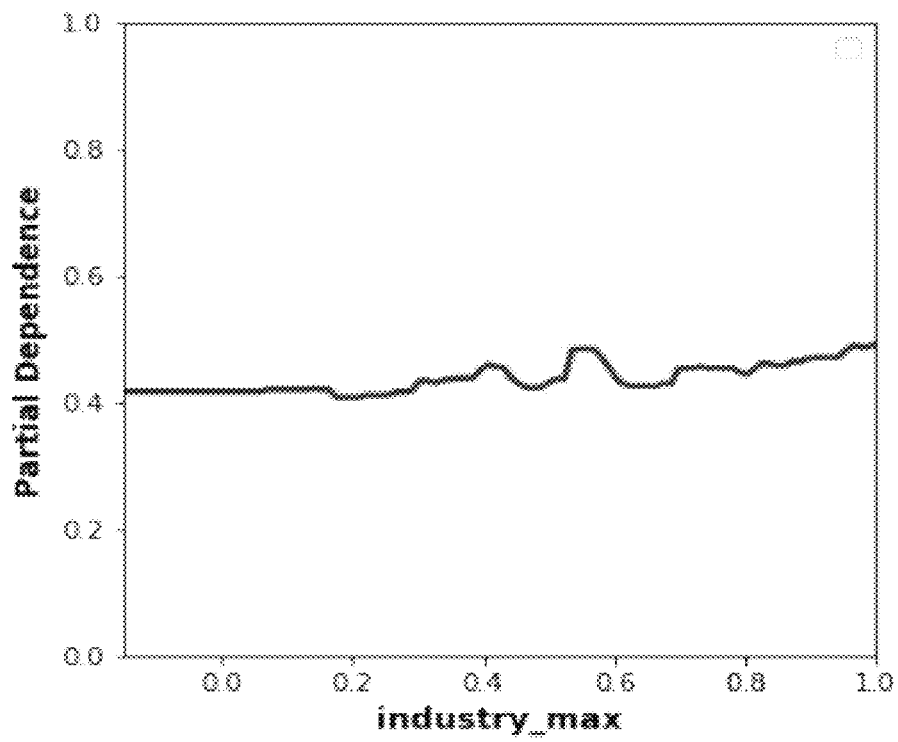
Figure 12G:
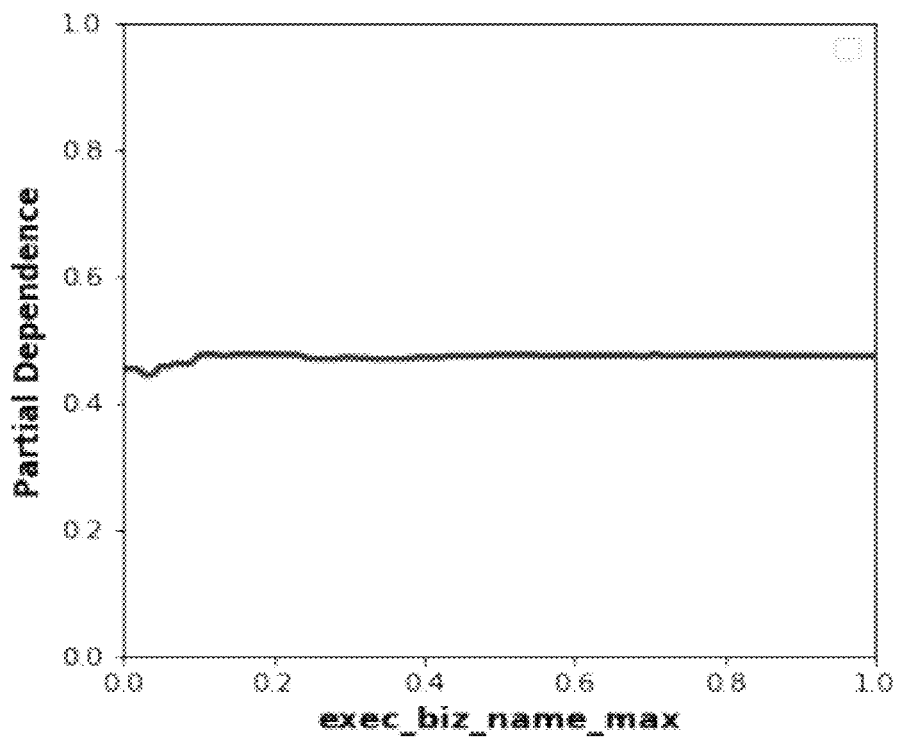
Figure 12H:
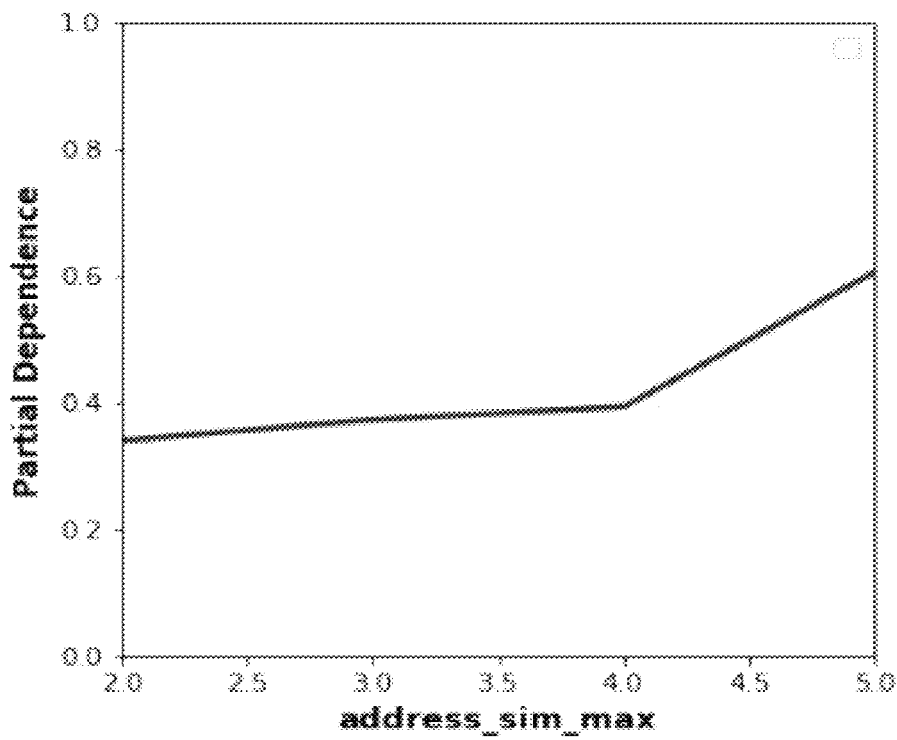
Figure 12I:
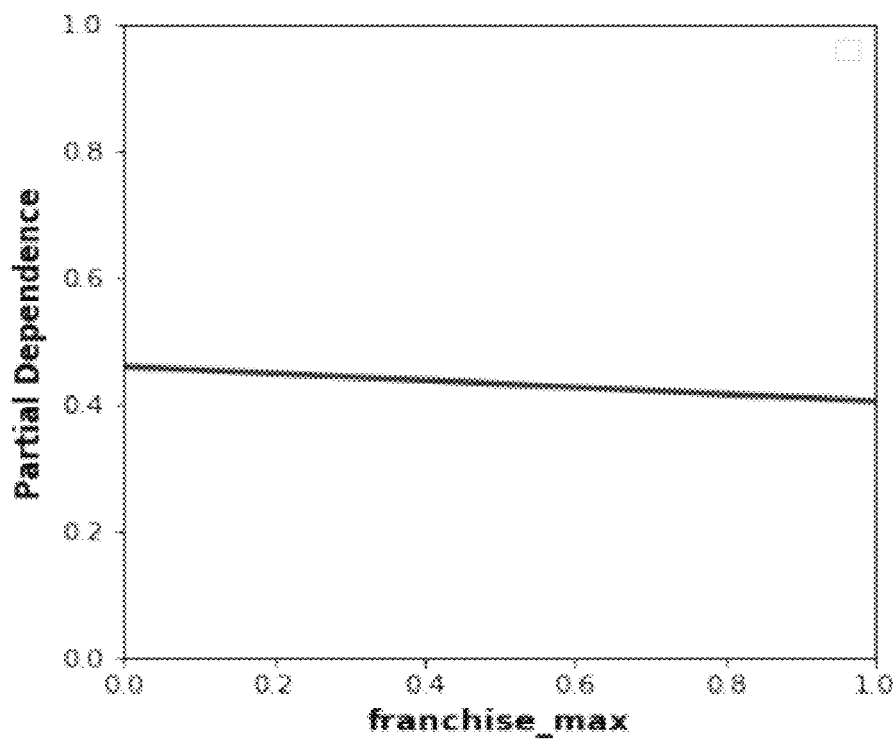
Figure 12J:
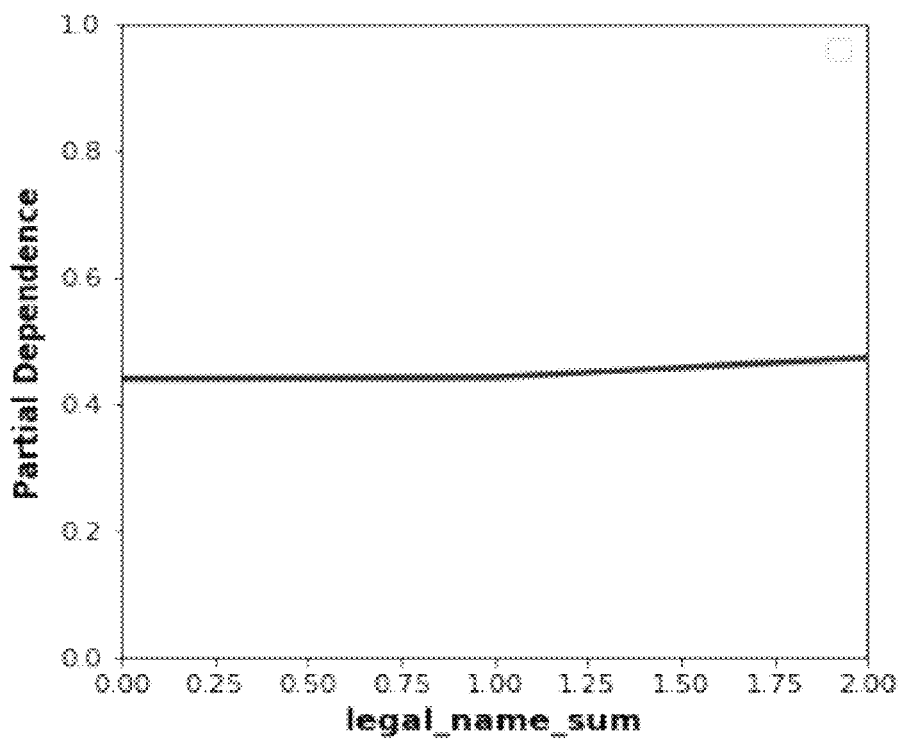
Figure 12K:
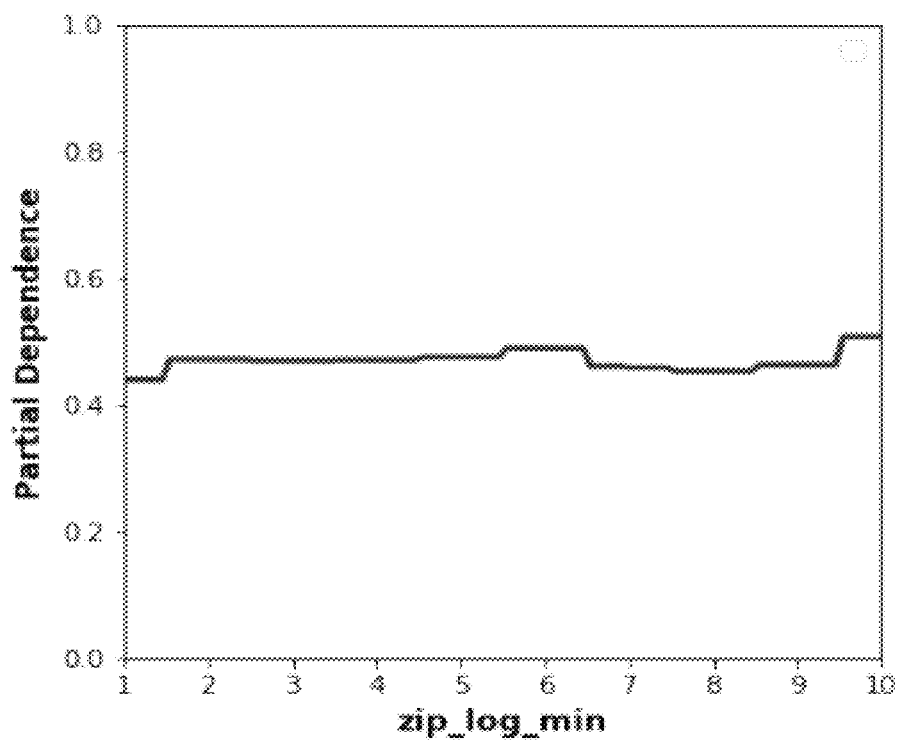

FIG. 11 is a diagram of results of receiver operating characteristics for entity resolution in accordance with one or more embodiments of the present disclosure. Using a ground-truth set of records for entity resolution, a false positive rate versus a true positive rate was computed for each feature in match scoring using, e.g., the feature score model 452 described above based on an error of the feature score model 452.

FIG. 12A through 12K is a diagram of results of partial dependence testing for entity resolution in accordance with one or more embodiments of the present disclosure. Using a ground-truth set of records for entity resolution, a partial dependence was computed against each of same data source maximum scores (e.g., an indicator having a flag of 1 for a common data source between records of a pair, or 0 for different data sources) (FIG. 12A), business name maximum scores (FIG. 12B), business name soundex maximum scores (FIG. 12C), executive name maximum scores (FIG. 12D), phone number maximum scores (FIG. 12E), industry name/category maximum scores (FIG. 12F), executive business name maximum scores (FIG. 12G), address similarity maximum scores (e.g., including similarity between: same state, same city, same zip codes, same geocodes, etc., where since businesses may have multiple addresses, the maximum of all addresses pairs is taken as an address similarity feature) (FIG. 12H), franchise name maximum scores (e.g., where a maximum franchise score according to the franchise feature described above is set as the score for the feature of the pair (e.g., 1 or 0)) (FIG. 12I), legal entity name maximum scores (e.g., where because entities may have both legal names and secondary names, the sum of the legal name indicators (described above) is for each pair is taken as a feature to indicate the presence of legal names in one, both or neither entity record of the pair) (FIG. 12J), and zip code count scores (where a number of zip codes for each record in a pair is counted and logged, with the minimum count being selected as the zip code count feature for the pair) (FIG. 12K) between pairs in match scoring using, e.g., the feature score model 452 described above based on an error of the feature score model 452.

At least some aspects of the present disclosure will now be described with reference to the following numbered clauses.

1. A method comprising:
   receiving, by at least one processor, a first entity record set comprising a plurality of first records associated with one or more entities;
      wherein each first entity record of the plurality of first entity records comprise respective first entity data representing identifying information associated with a respective first entity;
   receiving, by the at least one processor, a second entity record set comprising a plurality of second records associated with the one or more entities;
      wherein each second entity record of the plurality of second entity records comprise respective second entity data representing identifying information associated with a respective second entity;
   generating, by the at least one processor, candidate pairs based at least in part on a similarity between the first entity data of each first entity record and the second entity data of each second entity record;
      wherein each candidate pair comprises a first entity record of the plurality of first entity records and a second entity record of the plurality of second entity records;
   generating, by the at least one processor, one or more features for each respective candidate pair based at least in a part on a respective at least one similarity measure between a respective first entity record and a respective second entity record;
   utilizing, by the at least one processor, a scoring machine learning model to determine a match score for each candidate pair based at least in part on each feature of the one or more features for each candidate pair;
   determining, by the at least one processor, at least one cluster of candidate pairs based on the match score of each feature of the one or more features for each candidate pair;
   merging, by the at least one processor, records of candidate pairs of each respective cluster of the at least one cluster into a respective entity record of at least one entity record;
   determining, by the at least one processor, a respective entity associated with each respective entity record; and
   updating, by the at least one processor, an entity database with the at least one entity record.

2. The method as recited in clause 1, wherein the identifying information comprises:
   i) an entity name,
   ii) a secondary entity name,
   iii) an entity owner,
   iv) a phone number,
   v) a geographic location,
   vi) industry description,
   vii) franchise indicator, or
   viii) any combination thereof.

3. The method as recited in clause 1, wherein the one or more features for each respective candidate pair comprises:
   i) a similarity between a text or sound of an entity name between each of the respective first entity record and the respective second entity record,
   ii) a similarity between a location of each of the respective first entity record and the respective second entity record,
   iii) a similarity between a phone number of each of the respective first entity record and the respective second entity record,
   iv) a similarity between an entity owner of each of the respective first entity record and the respective second entity record,
   v) a similarity between an industry description of each of the respective first entity record and the respective second entity record,
   vi) a match between a franchise indicator of each of the respective first entity record and the respective second entity record, and
   vii) any combination thereof.

4. The method as recited in clause 1, further comprising filter, by the at least one processor, the candidate pairs by removing weak pairs; and
   wherein each weak pair comprises a respective match score below a threshold score.

5. The method as recited in clause 4, wherein the threshold score comprises 0.5.

6. The method as recited in clause 1, wherein generating the candidate pairs comprises:

generating, by the at least one processor, a plurality of first entity-second entity record pairs by pairing each first entity record of the plurality of first entity records with each second entity record of the plurality of second entity records;

determining, by the at least one processor, a minhash probability of similarity between a respective first entity record and a respective second entity record of each first entity-second entity record pair of the plurality of first entity-second entity record pairs to identify a first set of candidate pairs;

determining, by the at least one processor, a rule-based probability of similarity between a respective first entity record and a respective second entity record of each first entity-second entity record pair of the plurality of first entity-second entity record pairs based at least in part on a set of similarity measurement rules to identify a second set of candidate pairs; and combining, by the at least one processor, the first set of candidate pairs and the second set of candidate pairs to generate the candidate pairs.

7. The method as recited in clause 1, wherein the scoring machine learning model comprises Xgboost.

8. The method as recited in clause 1, wherein determining the at least one cluster of candidate pairs comprises:
utilizing, by the at least one process, graphing algorithms to cluster the candidate pairs.

9. The method as recited in clause 1, further comprising, determining, by the at least one processor, identifying information associated with a respective first entity or identifying information associated with a respective second entity or both comprising an entity type.

10. The method as recited in clause 9, wherein the entity type comprises a profession type.

11. A method comprising:
receiving, by at least one processor, a first entity record set comprising a plurality of first records associated with one or more entities;
wherein each first entity record of the plurality of first entity records comprise respective first entity data representing identifying information associated with a respective first entity;
receiving, by the at least one processor, a second entity record set comprising a plurality of second records associated with the one or more entities;
wherein each second entity record of the plurality of second entity records comprise respective second entity data representing identifying information associated with a respective second entity;
generating, by the at least one processor, candidate pairs based at least in part on a similarity between the first entity data of each first entity record and the second entity data of each second entity record using a combination of a minhash and rule-based probabilities of similarity;
wherein each candidate pair comprises a first entity record of the plurality of first entity records and a second entity record of the plurality of second entity records;
generating, by the at least one processor, one or more features for each respective candidate pair based at least in a part on a respective at least one similarity measure between a respective first entity record and a respective second entity record;
utilizing, by the at least one processor, a scoring machine learning model to determine a match score for each candidate pair based at least in part on Xgboost modelling of each feature of the one or more features for each candidate pair;

determining, by the at least one processor, at least one cluster of candidate pairs based on the match score of each feature of the one or more features for each candidate pair;

merging, by the at least one processor, records of candidate pairs of each respective cluster of the at least one cluster into a respective entity record of at least one entity record;

determining, by the at least one processor, a respective entity associated with each respective entity record; and updating, by the at least one processor, an entity database with the at least one entity record.

12. The method as recited in clause 11, wherein the identifying information comprises:
   i) an entity name,
   ii) a secondary entity name,
   iii) an entity owner,
   iv) a phone number,
   v) a geographic location,
   vi) industry description,
   vii) franchise indicator, or
   viii) any combination thereof.

13. The method as recited in clause 11, wherein the one or more features for each respective candidate pair comprises:
   i) a similarity between a text or sound of an entity name between each of the respective first entity record and the respective second entity record,
   ii) a similarity between a location of each of the respective first entity record and the respective second entity record,
   iii) a similarity between a phone number of each of the respective first entity record and the respective second entity record,
   iv) a similarity between an entity owner of each of the respective first entity record and the respective second entity record,
   v) a similarity between an industry description of each of the respective first entity record and the respective second entity record,
   vi) a match between a franchise indicator of each of the respective first entity record and the respective second entity record, and
   vii) any combination thereof.

14. The method as recited in clause 11, further comprising filter, by the at least one processor, the candidate pairs by removing weak pairs; and
wherein each weak pair comprises a respective match score below a threshold score.

15. The method as recited in clause 14, wherein the threshold score comprises 0.5.

16. The method as recited in clause 11, wherein generating the candidate pairs comprises:
generating, by the at least one processor, a plurality of first entity-second entity record pairs by pairing each first entity record of the plurality of first entity records with each second entity record of the plurality of second entity records;

determining, by the at least one processor, a minhash probability of similarity between a respective first entity record and a respective second entity record of each first entity-second entity record pair of the plurality of first entity-second entity record pairs to identify a first set of candidate pairs;

determining, by the at least one processor, a rule-based probability of similarity between a respective first entity record and a respective second entity record of each first entity-second entity record pair of the plurality of first entity-second entity record pairs based at least in part on a set of similarity measurement rules to identify a second set of candidate pairs; and combining, by the at least one processor, the first set of candidate pairs and the second set of candidate pairs to generate the candidate pairs.

17. The method as recited in clause 11, wherein determining the at least one cluster of candidate pairs comprises:
utilizing, by the at least one process, graphing algorithms to cluster the candidate pairs.

18. The method as recited in clause 11, further comprising, determining, by the at least one processor, identifying information associated with a respective first entity or identifying information associated with a respective second entity or both comprising an entity type.

19. The method as recited in clause 18, wherein the entity type comprises a profession type.

20. A system comprising:
an entity database configured to store entity records; and
at least one processor configured to perform instructions stored in a non-transitory storage medium, the instructions comprising:
receive a first entity record set comprising a plurality of first records associated with one or more entities;
wherein each first entity record of the plurality of first entity records comprise respective first entity data representing identifying information associated with a respective first entity;
receive a second entity record set comprising a plurality of second records associated with the one or more entities;
wherein each second entity record of the plurality of second entity records comprise respective second entity data representing identifying information associated with a respective second entity;
generate candidate pairs based at least in part on a similarity between the first entity data of each first entity record and the second entity data of each second entity record;
wherein each candidate pair comprises a first entity record of the plurality of first entity records and a second entity record of the plurality of second entity records;
generate one or more features for each respective candidate pair based at least in a part on a respective at least one similarity measure between a respective first entity record and a respective second entity record;
utilize a scoring machine learning model to determine a match score for each candidate pair based at least in part on each feature of the one or more features for each candidate pair;
determine at least one cluster of candidate pairs based on the match score of each feature of the one or more features for each candidate pair;
merge records of candidate pairs of each respective cluster of the at least one cluster into a respective entity record of at least one entity record;
determine a respective entity associated with each respective entity record; and
update the entity database with the at least one entity record.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added or any desired steps may be eliminated).

The invention claimed is:

1. A method comprising:
receiving, by at least one processor, a first entity record set comprising a plurality of first entity records associated with one or more entities;
wherein each first entity record of the plurality of first entity records comprise at least one first entity data item representing identifying information associated with a first entity;
receiving, by the at least one processor, a second entity record set comprising a plurality of second entity records associated with the one or more entities;
wherein each second entity record of the plurality of second entity records comprise at least one second entity data item representing identifying information associated with a second entity;
generating, by the at least one processor, a similarity score for each pairing of the at least one first entity data item of each first entity record and the at least one second entity data item of each second entity record based at least in part on a combination of the plurality of similarity measures of each pairing;
generating, by the at least one processor, candidate pairs based at least in part on the similarity score between the first entity data of each first entity record and the second entity data of each second entity record;
wherein each candidate pair comprises a first entity record of the plurality of first entity records and a second entity record of the plurality of second entity records;
generating, by the at least one processor, one or more features for each candidate pair based at least in a part on at least one similarity measure between the first entity record and the second entity record of each candidate pair;
utilizing, by the at least one processor, a scoring neural network to determine at least one matched pair for at least one candidate pair based at least in part on each feature of the one or more features for each candidate pair;
wherein the scoring neural network is trained to produce a match score to indicate a probability of the first entity record and the second entity record of each candidate pair being a match to a common entity;
wherein the matched pair for the at least one candidate pair comprises the match score exceeding a predetermined threshold;
determining, by the at least one processor, at least one cluster of at least one matched pair based on the match score of each feature of the one or more features for each candidate pair;
determining, by the at least one processor, at least one primary entity record for the at least one cluster based on a comparison between each data item of the at least one primary entity record and at least one data item-specific rule;
merging, by the at least one processor, the at least one matched pair of the at least one cluster into a merged entity record having at least one data item associated with the at least one primary entity record representing identifying information of at least one particular entity associated with the at least one cluster of candidate pairs;

updating, by the at least one processor, an entity database with the at least one entity record; and deploying, by the at least one processor, the at least one database with the merged entity records in place of each cluster of entity records to reduce resource consumption.

2. The method as recited in claim 1, wherein the identifying information comprises:
  i) an entity name,
  ii) a secondary entity name,
  iii) an entity owner,
  iv) a phone number,
  v) a geographic location,
  vi) industry description,
  vii) franchise indicator, or
  viii) any combination thereof.

3. The method as recited in claim 1, wherein the one or more features for each respective candidate pair comprises:
  i) a similarity between a text or sound of an entity name between each of the respective first entity record and the respective second entity record,
  ii) a similarity between a location of each of the respective first entity record and the respective second entity record,
  iii) a similarity between a phone number of each of the respective first entity record and the respective second entity record,
  iv) a similarity between an entity owner of each of the respective first entity record and the respective second entity record,
  v) a similarity between an industry description of each of the respective first entity record and the respective second entity record,
  vi) a match between a franchise indicator of each of the respective first entity record and the respective second entity record, and
  vii) any combination thereof.

4. The method as recited in claim 1, further comprising filter, by the at least one processor, the candidate pairs by removing weak pairs; and
  wherein each weak pair comprises a respective match score below a threshold score.

5. The method as recited in claim 4, wherein the threshold score comprises 0.5.

6. The method as recited in claim 1, wherein generating the candidate pairs comprises:
  generating, by the at least one processor, a plurality of first entity-second entity record pairs by pairing each first entity record of the plurality of first entity records with each second entity record of the plurality of second entity records;
  determining, by the at least one processor, a minhash probability of similarity between a respective first entity record and a respective second entity record of each first entity-second entity record pair of the plurality of first entity-second entity record pairs to identify a first set of candidate pairs;
  determining, by the at least one processor, a rule-based probability of similarity between a respective first entity record and a respective second entity record of each first entity-second entity record pair of the plurality of first entity-second entity record pairs based at least in part on a set of similarity measurement rules to identify a second set of candidate pairs; and
  combining, by the at least one processor, the first set of candidate pairs and the second set of candidate pairs to generate the candidate pairs.

7. The method as recited in claim 1, wherein the scoring neural network comprises Xgboost.

8. The method as recited in claim 1, wherein determining the at least one cluster of candidate pairs comprises:
  utilizing, by the at least one process, at least one graphing algorithm to cluster the candidate pairs.

9. The method as recited in claim 1, further comprising, determining, by the at least one processor, identifying information associated with a respective first entity or identifying information associated with a respective second entity or both comprising an entity type.

10. The method as recited in claim 9, wherein the entity type comprises a profession type.

11. A method comprising:
  receiving, by at least one processor, a first entity record set comprising a plurality of first entity records associated with one or more entities;
    wherein each first entity record of the plurality of first entity records comprise at least one first entity data item representing identifying information associated with a first entity;
  receiving, by the at least one processor, a second entity record set comprising a plurality of second entity records associated with the one or more entities;
    wherein each second entity record of the plurality of second entity records comprise at least one second entity data item representing identifying information associated with a second entity;
  generating, by the at least one processor, a similarity score for each pairing of the at least one first entity data item of each first entity record and the at least one second entity data item of each second entity record based at least in part on a combination of the plurality of similarity measures of each pairing;
  generating, by the at least one processor, candidate pairs based at least in part on the similarity score between the first entity data of each first entity record and the second entity data of each second entity record using a combination of a minhash and rule-based probabilities of similarity;
    wherein each candidate pair comprises a first entity record of the plurality of first entity records and a second entity record of the plurality of second entity records;
  generating, by the at least one processor, one or more features for each candidate pair based at least in a part on at least one similarity measure between the first entity record and the second entity record of each candidate pair;
  utilizing, by the at least one processor, a scoring neural network to determine at least one matched pair for at least one candidate pair based at least in part on Xgboost modelling of each feature of the one or more features for each candidate pair;
    wherein the scoring neural network is trained to produce a match score to indicate a probability of the first entity record and the second entity record of each candidate pair being a match to a common entity;
    wherein the matched pair for the at least one candidate pair comprises the match score exceeding a predetermined threshold;
  determining, by the at least one processor, at least one cluster of at least one matched pair based on the match score of each feature of the one or more features for each candidate pair;

determining, by the at least one processor, at least one primary entity record for the at least one cluster based on a comparison between each data item of the at least one primary entity record and at least one data item-specific rule;

merging, by the at least one processor, the at least one matched pair of the at least one cluster into a merged entity record having at least one data item associated with the at least one primary entity record representing identifying information of at least one particular entity associated with the at least one cluster of candidate pairs; and deploying, by the at least one processor, the at least one database with the merged entity records in place of each cluster of entity records to reduce resource consumption.

12. The method as recited in claim 11, wherein the identifying information comprises:
    i) an entity name,
    ii) a secondary entity name,
    iii) an entity owner,
    iv) a phone number,
    v) a geographic location,
    vi) industry description,
    vii) franchise indicator, or
    viii) any combination thereof.

13. The method as recited in claim 11, wherein the one or more features for each respective candidate pair comprises:
    i) a similarity between a text or sound of an entity name between each of the respective first entity record and the respective second entity record,
    ii) a similarity between a location of each of the respective first entity record and the respective second entity record,
    iii) a similarity between a phone number of each of the respective first entity record and the respective second entity record,
    iv) a similarity between an entity owner of each of the respective first entity record and the respective second entity record,
    v) a similarity between an industry description of each of the respective first entity record and the respective second entity record,
    vi) a match between a franchise indicator of each of the respective first entity record and the respective second entity record, and
    vii) any combination thereof.

14. The method as recited in claim 11, further comprising filter, by the at least one processor, the candidate pairs by removing weak pairs; and
    wherein each weak pair comprises a respective match score below a threshold score.

15. The method as recited in claim 14, wherein the threshold score comprises 0.5.

16. The method as recited in claim 11, wherein generating the candidate pairs comprises:
    generating, by the at least one processor, a plurality of first entity-second entity record pairs by pairing each first entity record of the plurality of first entity records with each second entity record of the plurality of second entity records;
    determining, by the at least one processor, a minhash probability of similarity between a respective first entity record and a respective second entity record of each first entity-second entity record pair of the plurality of first entity-second entity record pairs to identify a first set of candidate pairs;
    determining, by the at least one processor, a rule-based probability of similarity between a respective first entity record and a respective second entity record of each first entity-second entity record pair of the plurality of first entity-second entity record pairs based at least in part on a set of similarity measurement rules to identify a second set of candidate pairs; and
    combining, by the at least one processor, the first set of candidate pairs and the second set of candidate pairs to generate the candidate pairs.

17. The method as recited in claim 11, wherein determining the at least one cluster of candidate pairs comprises:
    utilizing, by the at least one process, at least one graphing algorithm to cluster the candidate pairs.

18. The method as recited in claim 11, further comprising, determining, by the at least one processor, identifying information associated with a respective first entity or identifying information associated with a respective second entity or both comprising an entity type.

19. The method as recited in claim 18, wherein the entity type comprises a profession type.

20. A system comprising:
    an entity database configured to store entity records; and
    at least one processor configured to perform instructions stored in a non-transitory storage medium, the instructions comprising:
        receive a first entity record set comprising a plurality of first entity records associated with one or more entities;
            wherein each first entity record of the plurality of first entity records comprise at least one first entity data item representing identifying information associated with a first entity;
        receive a second entity record set comprising a plurality of second entity records associated with the one or more entities;
            wherein each second entity record of the plurality of second entity records comprise at least one second entity data item representing identifying information associated with a second entity;
        generate a similarity score for each pairing of the at least one first entity data item of each first entity record and the at least one second entity data item of each second entity record based at least in part on a combination of the plurality of similarity measures of each pairing;
        generate candidate pairs based at least in part on the similarity score between the first entity data of each first entity record and the second entity data of each second entity record;
            wherein each candidate pair comprises a first entity record of the plurality of first entity records and a second entity record of the plurality of second entity records;
        generate one or more features for each candidate pair based at least in a part on at least one similarity measure between the first entity record and the second entity record of each candidate pair;
        utilize a scoring neural network to determine at least one matched pair for at least one candidate pair based at least in part on each feature of the one or more features for each candidate pair;
            wherein the scoring neural network is trained to produce a match score to indicate a probability of the first entity record and the second entity record of each candidate pair being a match to a common entity;

wherein the matched pair for the at least one candidate pair comprises the match score exceeding a predetermined threshold;

determine at least one cluster of at least one matched pair based on the match score of each feature of the one or more features for each candidate pair;

determine at least one primary entity record for the at least one cluster based on a comparison between each data item of the at least one primary entity record and at least one data item-specific rule;

merge the at least one matched pair of the at least one cluster into a merged entity record having at least one data item associated with the at least one primary entity record representing identifying information of at least one particular entity associated with the at least one cluster of candidate pairs;

update the entity database with the at least one entity record; and deploy the at least one database with the merged entity records in place of each cluster of entity records to reduce resource consumption.

\* \* \* \* \*